(12) United States Patent
Miller et al.

(10) Patent No.: US 11,597,860 B2
(45) Date of Patent: Mar. 7, 2023

(54) MAGNETIZABLE ABRASIVE PARTICLE AND METHOD OF MAKING THE SAME

(71) Applicant: 3M INNOVATIVE PROPERTIES COMPANY, St. Paul, MN (US)

(72) Inventors: Adam D. Miller, St. Paul, MN (US); Sergei Manuilov, Stillwater, MN (US); Naiyong Jing, St. Paul, MN (US); Taisiya Skorina, Woodbury, MN (US); Aaron K. Nienaber, Maplewood, MN (US); Joseph B. Eckel, Vadnais Heights, MN (US); Thomas J. Anderson, Cottage Grove, MN (US); Thomas J. Nelson, Woodbury, MN (US); Mark A. Lukowski, St. Paul, MN (US); Louis S. Moren, Oakdale, MN (US); Don V. West, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 986 days.

(21) Appl. No.: 16/338,756

(22) PCT Filed: Oct. 24, 2017

(86) PCT No.: PCT/US2017/057976
§ 371 (c)(1),
(2) Date: Apr. 2, 2019

(87) PCT Pub. No.: WO2018/081044
PCT Pub. Date: May 3, 2018

(65) Prior Publication Data
US 2020/0071584 A1    Mar. 5, 2020

Related U.S. Application Data

(60) Provisional application No. 62/526,814, filed on Jun. 29, 2017, provisional application No. 62/412,470, filed on Oct. 25, 2016.

(51) Int. Cl.
*C04B 35/628* (2006.01)
*C09K 3/14* (2006.01)
(Continued)

(52) U.S. Cl.
CPC .............. *C09K 3/1445* (2013.01); *B24D 3/14* (2013.01); *C04B 35/10* (2013.01);
(Continued)

(58) Field of Classification Search
CPC .... C09K 3/1445; C09K 3/1436; C04B 35/10; C04B 35/62842; C04B 35/6316;
(Continued)

(56) References Cited

U.S. PATENT DOCUMENTS

| 1,930,788 A | 10/1933 | Buckner |
| 2,370,636 A | 3/1945 | Carlton |

(Continued)

FOREIGN PATENT DOCUMENTS

| CA | 2545903 | 2/2015 |
| CN | 1830626 | 9/2006 |

(Continued)

OTHER PUBLICATIONS

Lin, "Magnetic Properties of Hematite Single Crystals. I. Magnetization Isotherms, Antiferromagnetic Susceptibility, and Weak Ferromagnetism of a Natural Crystal", Physical Review, Dec. 1959, vol. 116, No. 6, 6 pages.

(Continued)

*Primary Examiner* — Noah S Wiese
(74) *Attorney, Agent, or Firm* — Katherine M. Scholz; Aleksander Medved

(57) ABSTRACT

Magnetizable abrasive particles are described comprising ceramic particles having outer surfaces comprising a coating of unsintered polyion and magnetic particles bonded to the polyion. In favored embodiments, the magnetic particles (Continued)

have a magnetic saturation of at least 10, 15, 20, 25, 30, 35, 40, 45 or 50 emu/gram. In another embodiment, an abrasive article is described comprising a plurality of magnetizable abrasive particles as described herein retained in a binder material. Also described are method of making magnetizable abrasive particles and methods of making an abrasive article comprising magnetizable abrasive particles.

20 Claims, 7 Drawing Sheets

(51) Int. Cl.
  B24D 3/14      (2006.01)
  C04B 35/10     (2006.01)
  C04B 35/63     (2006.01)
  H01F 1/28      (2006.01)
  H01F 1/37      (2006.01)
(52) U.S. Cl.
  CPC .... *C04B 35/62842* (2013.01); *C04B 35/6316* (2013.01); *C09K 3/1427* (2013.01); *H01F 1/28* (2013.01); *H01F 1/37* (2013.01); *C04B 2235/3217* (2013.01); *C04B 2235/3427* (2013.01); *C04B 2235/405* (2013.01); *C04B 2235/606* (2013.01)
(58) Field of Classification Search
  CPC .... C04B 2235/3217; C04B 2235/3427; C04B 2235/405; C04B 2235/606
  See application file for complete search history.

(56) References Cited

U.S. PATENT DOCUMENTS

| | | |
|---|---|---|
| 2,527,044 A | 10/1950 | Walton |
| 2,857,879 A | 10/1958 | Johnson |
| 2,947,616 A | 8/1960 | Coes, Jr. |
| 2,958,593 A | 11/1960 | Hoover |
| 3,306,719 A | 2/1967 | Fringhian |
| 3,495,960 A | 2/1970 | Schladitz |
| 3,625,666 A | 12/1971 | James |
| 3,918,217 A | 11/1975 | Oliver |
| 4,008,055 A | 2/1977 | Phaal |
| 4,018,575 A | 4/1977 | Davis |
| 4,227,350 A | 10/1980 | Fitzer |
| 4,246,004 A | 1/1981 | Busch |
| 4,314,827 A | 2/1982 | Leitheiser |
| 4,331,453 A | 5/1982 | Dau |
| 4,609,380 A | 9/1986 | Barnett |
| 4,623,364 A | 11/1986 | Cottringer |
| 4,652,275 A | 3/1987 | Bloecher |
| 4,734,104 A | 3/1988 | Broberg |
| 4,744,802 A | 5/1988 | Schwabel |
| 4,751,137 A | 6/1988 | Haelg |
| 4,770,671 A | 9/1988 | Monroe |
| 4,800,685 A | 1/1989 | Haynes, Jr. |
| 4,881,951 A | 11/1989 | Wood |
| 4,898,597 A | 2/1990 | Hay |
| 4,916,869 A | 4/1990 | Oliver |
| 4,933,373 A | 6/1990 | Moren |
| 4,991,362 A | 2/1991 | Heyer |
| 5,009,675 A | 4/1991 | Kunz |
| 5,137,542 A | 4/1992 | Buchanan |
| 5,152,917 A | 10/1992 | Pieper |
| 5,181,939 A | 1/1993 | Neff |
| 5,201,916 A | 4/1993 | Berg |
| 5,213,591 A | 5/1993 | Celikkaya |
| 5,282,875 A | 2/1994 | Wood |
| 5,366,523 A | 11/1994 | Rowenhorst |
| 5,380,390 A | 1/1995 | Tselesin |
| 5,417,726 A | 5/1995 | Stout |
| 5,435,816 A | 7/1995 | Spurgeon |
| 5,500,273 A | 3/1996 | Holmes |
| 5,554,068 A | 9/1996 | Carr |
| 5,573,619 A | 11/1996 | Benedict |
| 5,591,239 A | 1/1997 | Larson |
| RE35,570 E | 7/1997 | Rowenhorst |
| 5,672,097 A | 9/1997 | Hoopman |
| 5,681,361 A | 10/1997 | Sanders, Jr. |
| 5,698,016 A | 12/1997 | Adams |
| 5,712,210 A | 1/1998 | Windisch |
| 5,817,204 A | 10/1998 | Tselesin |
| 5,858,140 A | 1/1999 | Berger |
| 5,891,204 A | 4/1999 | Neff |
| 5,928,070 A | 7/1999 | Lux |
| 5,942,015 A | 8/1999 | Culler |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,083,631 A | 7/2000 | Neff |
| 6,120,568 A | 9/2000 | Neff |
| 6,129,540 A | 10/2000 | Hoopman |
| 6,207,246 B1 | 3/2001 | Moren |
| 6,261,682 B1 | 7/2001 | Law |
| 6,302,930 B1 | 10/2001 | Lux |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,262,758 B2 | 9/2012 | Gao |
| 8,764,865 B2 | 7/2014 | Boden |
| 9,776,302 B2 | 10/2017 | Keipert |
| 2005/0022457 A1 | 2/2005 | Chen et al. |
| 2005/0218566 A1 | 10/2005 | Suzuki |
| 2006/0188876 A1 | 8/2006 | Kilaas |
| 2008/0131705 A1 | 6/2008 | Colburn |
| 2008/0141905 A1 | 6/2008 | Juergens |
| 2008/0289262 A1 | 11/2008 | Gao |
| 2009/0100766 A1 | 4/2009 | Gebhardt |
| 2009/0165394 A1 | 7/2009 | Culler |
| 2009/0169816 A1 | 7/2009 | Erickson |
| 2010/0146867 A1 | 6/2010 | Boden |
| 2011/0088330 A1 | 4/2011 | Beekman |
| 2012/0227333 A1 | 9/2012 | Adefris |
| 2013/0040537 A1 | 2/2013 | Schwabel |
| 2013/0125477 A1 | 5/2013 | Adefris |
| 2013/0244552 A1 | 9/2013 | Lee |
| 2013/0252521 A1 | 9/2013 | Kasashima |
| 2013/0252522 A1 | 9/2013 | Kasashima |
| 2013/0344786 A1 | 12/2013 | Keipert |
| 2014/0106126 A1 | 4/2014 | Gaeta |
| 2014/0237907 A1 | 8/2014 | Boden |
| 2014/0290147 A1 | 10/2014 | Seth |
| 2014/0291895 A1 | 10/2014 | Kanade |
| 2015/0004890 A1 | 1/2015 | Krstic et al. |
| 2015/0267097 A1 | 9/2015 | Rosenflanz |
| 2015/0291865 A1 | 10/2015 | Breder |
| 2016/0221153 A1 | 8/2016 | Rizzo |

FOREIGN PATENT DOCUMENTS

| | | | | |
|---|---|---|---|---|
| CN | 101353566 | 6/2011 | | |
| CN | 103770020 | 5/2014 | | |
| CN | 103846819 | 6/2014 | | |
| CN | 104999385 A | * 10/2015 | ......... | B24D 18/0009 |
| CN | 104191385 | 5/2016 | | |
| CN | 103590090 | 6/2016 | | |
| CN | 104999385 | 5/2018 | | |
| DE | 3042643 | 7/1981 | | |
| DE | 102012221316 | 5/2014 | | |
| DE | 202014101741 | 6/2014 | | |
| DE | 102013212609 | 12/2014 | | |
| DE | 102013212617 | 12/2014 | | |
| DE | 102013212639 | 12/2014 | | |
| DE | 102013212666 | 12/2014 | | |
| DE | 102013212684 | 12/2014 | | |
| EP | 1122718 A2 | 8/2001 | | |
| GB | 396231 | 8/1933 | | |
| GB | 1477767 | 6/1977 | | |
| JP | S60-177870 | 9/1985 | | |

(56) References Cited

FOREIGN PATENT DOCUMENTS

| | | |
|---|---|---|
| JP | S63-232947 | 9/1988 |
| JP | H07-078509 | 3/1995 |
| JP | H11-165252 | 6/1999 |
| JP | 2002-053367 | 2/2002 |
| JP | 2004-098265 | 4/2004 |
| JP | 2004-098266 | 4/2004 |
| JP | 2005-153106 | 6/2005 |
| JP | 2006-089586 | 4/2006 |
| JP | 2012-131017 | 7/2012 |
| JP | 2012-131018 | 7/2012 |
| JP | 2015-155142 | 8/2015 |
| SU | 1495100 | 7/1989 |
| WO | WO 94-027833 | 12/1994 |
| WO | WO 2002-062906 | 8/2002 |
| WO | WO 2010-041645 | 4/2010 |
| WO | WO 2012-112305 | 8/2012 |
| WO | WO 2015-048768 | 4/2015 |
| WO | WO 2015-100018 | 7/2015 |
| WO | WO 2015-100020 | 7/2015 |
| WO | WO 2015-100220 | 7/2015 |
| WO | WO 2016-062879 | 4/2016 |
| WO | WO-2016062879 A1 * | 4/2016 |
| WO | WO 2017-136188 | 8/2017 |
| WO | WO 2018-080703 | 5/2018 |
| WO | WO 2018-080704 | 5/2018 |
| WO | WO 2018-080705 | 5/2018 |
| WO | WO 2018-080755 | 5/2018 |
| WO | WO 2018-080756 | 5/2018 |
| WO | WO 2018-080765 | 5/2018 |
| WO | WO 2018-080784 | 5/2018 |
| WO | WO 2018-080799 | 5/2018 |
| WO | WO 2018-134732 | 7/2018 |
| WO | WO 2018-136268 | 7/2018 |
| WO | WO 2018-136269 | 7/2018 |
| WO | WO 2018-136271 | 7/2018 |

OTHER PUBLICATIONS

Pei, "Controlled Monodisperse Fe Nanoparticles Synthesized by Chemical Method", IEEE Transactions on Magnetics, Oct. 2005, vol. 41, No. 10, pp. 3391-3393.

Qin, "Ni80Fe20 Permalloy Nanoparticles: Wet Chemical Preparation, Size Control and Their Dynamic Permeability Characteristics When Composited with Femicron Particles", Journal of Magnetism and Magnetic Materials, Dec. 2009, vol. 321, No. 24, pp. 4057-4062.

Rampal, "Comparing the Magnetic Abrasives by Investigating the Surface Finish", Journal of Engineering, Computers & Applied Sciences, Oct. 2012, vol. 1, No. 1, pp. 20-24.

Taheri, "Synthesis of Ferrite and Nickel Ferrite Nanoparticles Using Radio-Frequency Thermal Plasma Torch", Journal of Applied Physics, May 2002, vol. 91, No. 10, pp. 7589-7591.

Viau, "Monodisperse Iron-Based Particles: Precipitation in Liquid Polyols", Journal of Materials Chemistry, Jan. 1996, vol. 6, No. 6, pp. 1047-1053.

International Search Report for PCT International Application No. PCT/US2017/057976, dated Jan. 29, 2018, 4 pages.

Extended European Search Report, EP17865700.3, dated Jun. 3, 2020, 4 pages.

* cited by examiner

MAGNETIZABLE ABRASIVE PARTICLE AND METHOD OF MAKING THE SAME

CROSS REFERENCE TO RELATED APPLICATIONS

This application is a national stage filing under 35 U.S.C. 371 of PCT/US2017/057976, filed Oct. 24, 2017, which claims the benefit of U.S. Provisional Application No. 62/412,470, filed Oct. 25, 2016 and U.S. Provisional Application No. 62/526,814, filed Jun. 29, 2017, the disclosures of which are incorporated by reference in their entireties herein.

TECHNICAL FIELD

The present disclosure broadly relates to abrasive particles, abrasive articles, and methods of making them.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive particles include abrasive particles retained in a binder matrix that can be resinous or vitreous. Examples include, grindstones, cutoff wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles have been used to align crushed abrasive particles with the longitudinal axes perpendicular to the backing. Likewise, shaped abrasive particles have been aligned by mechanical methods as disclosed in U.S. Pat. No. 9,776,302 (Keipert).

Precise placement and orientation of abrasive particles in bonded abrasive articles has been described in the patent literature. For example, U.S. Pat. No. 1,930,788 (Buckner) describes the use of magnetic flux to orient abrasive grain having a thin coating of iron dust in bonded abrasive articles. Likewise, British (GB) Pat. No. 396,231 (Buckner) describes the use of a magnetic field to orient abrasive grain having a thin coating of iron or steel dust to orient the abrasive grain in bonded abrasive articles. Using this technique, abrasive particles were radially oriented in bonded wheels.

U.S. Pat. No. 8,262,758 (Gao) discloses equipment for making abrasive particles in even distribution, array pattern, and preferred orientation. Using electric current to form a magnetic field causing acicular soft magnetic metallic sticks to absorb or release abrasive particles plated with soft magnetic materials.

There is a continuing need for new materials and methods for bonding magnetic materials to abrasive particles.

SUMMARY

In one embodiment, a method of making magnetizable abrasive particles is described. The method comprises a) providing ceramic particles, each ceramic particle having a respective outer surface;

b) coating the outer surfaces of ceramic particles with an aqueous solution comprising a polyion thereby forming polyion-coated ceramic particles;

c) combining the polyion-coated ceramic particles with magnetic particles while dispersed in an aqueous solution thereby forming magnetic particle-coated ceramic particles;

d) drying the magnetic particle-coated ceramic particles in the absence of sintering the polyion.

The method can be a two-step method wherein steps b) and c) are conducted sequentially. Alternatively, the method can be a one-step method wherein steps b) and c) are combined. In other words, the aqueous solution comprising the polyionic material further comprise magnetic particles.

In some embodiments, the magnetic particles have an average primary particle size ranging from 50 to 250 nanometers. In some embodiments, the ceramic particles have a maximum dimension no greater than 2, 1.5, 1.0, 0.5, or 0.25 mm. The ceramic particles typically have an aspect ratio of at least 2. The method is particularly useful for coating relatively small ceramic particles with even smaller magnetic nanoparticles. The method is also amenable to producing magnetizable abrasive particles having little or no agglomerated magnetic particle coated ceramic particles.

In another embodiment, magnetizable abrasive particles are described comprising ceramic particles having outer surfaces comprising a coating of unsintered polyion and magnetic particles bonded to the polyion. In favored embodiments, the magnetic particles have a magnetic saturation of at least 10, 15, 20, 25, 30, 35, 40, 45 or 50 emu/gram.

In another embodiment, an abrasive article is described comprising a plurality of magnetizable abrasive particles as described herein retained in a binder material.

In another embodiment, a method of making an abrasive article is described, the method comprising steps: a) applying a binder precursor to a backing; b) applying the magnetizable abrasive particles described herein to the binder precursor; c) applying a magnetic field to orient the magnetizable abrasive particles; and d) drying and/or curing the binder precursor sufficient to fix the respective orientations of the magnetizable abrasive particles.

As used herein:

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly m magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., or capable of being made so, unless otherwise specified. Preferably, magnetizable layers according to the present disclosure either have, or can be made to have by exposure to an applied magnetic field, a magnetic moment of at least 0.001 electromagnetic units (emu), more preferably at least 0.005 emu, more preferably 0.01 emu, up to an including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

The term "moist" means slightly wet; damp.

The term "shaped abrasive particle" refers to a ceramic abrasive particle that has been intentionally shaped (e.g., extruded, die cut, molded, screen-printed) at some point during its preparation such that the resulting ceramic body is non-randomly shaped. The term "shaped abrasive particle" as used herein excludes ceramic bodies obtained by a mechanical crushing or milling operation.

The term "platey crushed abrasive particle", which refers to a crushed abrasive particle resembling a platelet and/or flake that is characterized by a thickness that is less than the width and length. For example, the thickness may be less than ½, ⅓, ¼, ⅕, ⅙, 1/7, ⅛, 1/9, or even less than 1/10 of the length and/or width. Likewise, the width may be less than ½, ⅓, ¼, ⅕, ⅙, 1/7, ⅛, 1/9, or even less than 1/10 of the length.

The term "essentially free of" means containing less than 5 percent by weight (e.g., less than 4, 3, 2, 1, 0.1, or even less than 0.01 percent by weight, or even completely free) of, based on the total weight of the object being referred to.

The terms "precisely-shaped abrasive particle" refers to an abrasive particle wherein at least a portion of the abrasive particle has a predetermined shape that is replicated from a mold cavity used to form a precursor precisely-shaped abrasive particle that is sintered to form the precisely-shaped abrasive particle. A precisely-shaped abrasive particle will generally have a predetermined geometric shape that substantially replicates the mold cavity that was used to form the abrasive particle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object. The term "substantially" means within 35 percent (preferably within 30 percent, more preferably within 25 percent, more preferably within 20 percent, more preferably within 10 percent, and more preferably within 5 percent) of the attribute being referred to.

The suffix "(s)" indicates that the modified word can be singular or plural Features and advantages of the present disclosure will be further understood upon consideration of the detailed description as well as the appended claims.

Figure 1:
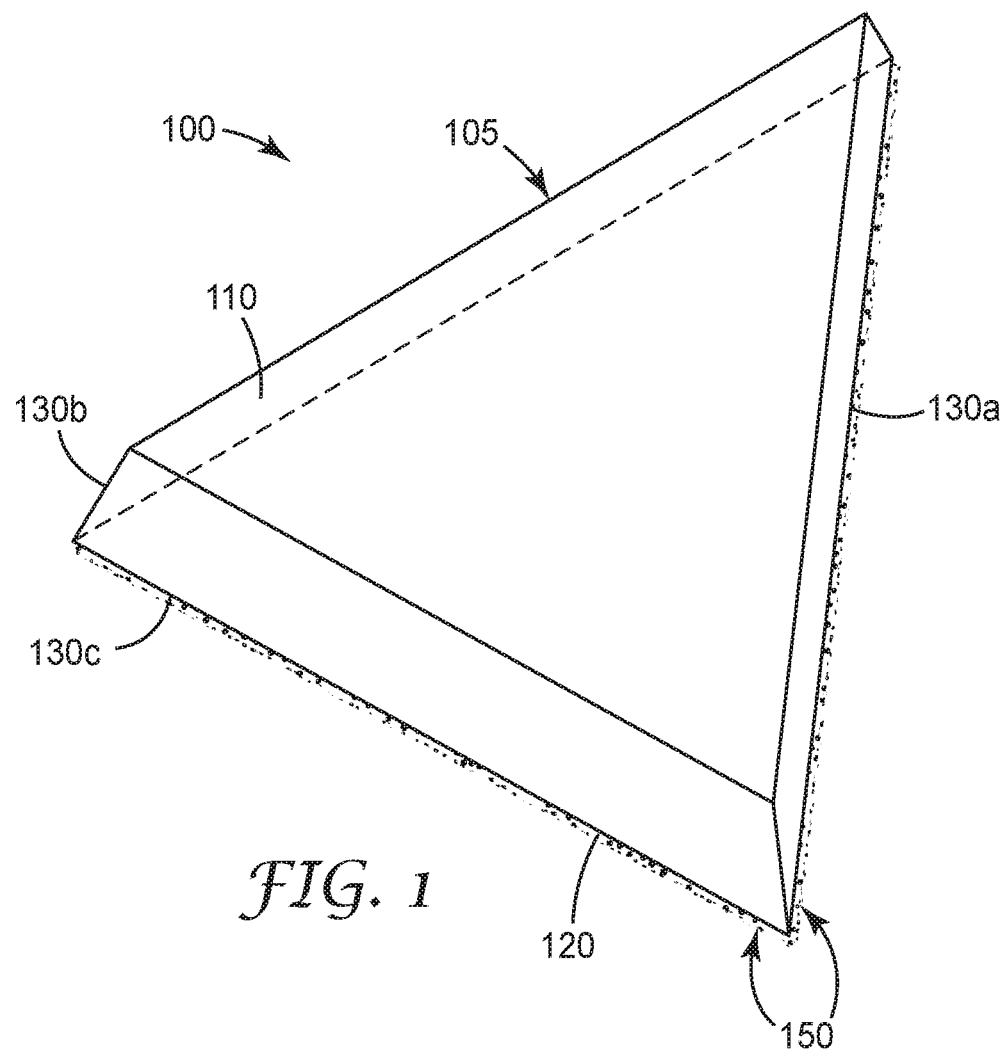
FIG. 1 is a schematic perspective view of an exemplary magnetizable abrasive particle 100 according to one embodiment of the present disclosure.
Figure 1A:
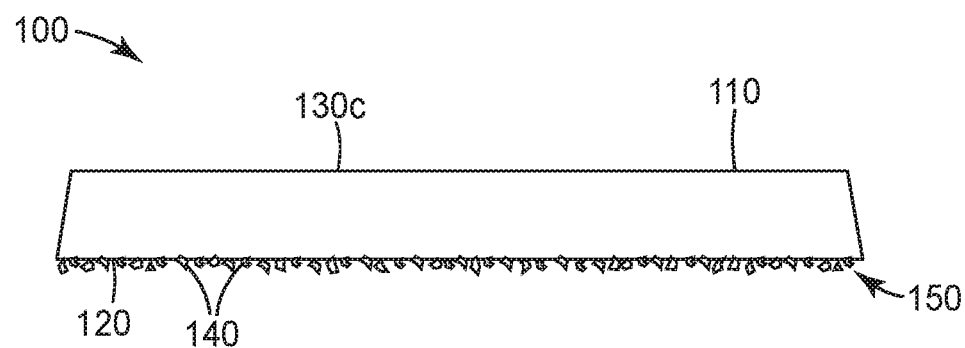
FIG. 1A is a schematic side view of magnetizable abrasive particle 100.

The figures may not be drawn to scale.

DETAILED DESCRIPTION

Presently described are magnetizable abrasive particles, methods of making such particles, and abrasive articles comprising such magnetizable abrasive particles.

Methods according to the present disclosure include a series of sequential steps, which may be consecutive or not.

In a first step, ceramic particles are provided, ceramic particle has a respective outer surface. The ceramic particles can be particles of any abrasive material. Useful ceramic materials that can be used as include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint.

Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The ceramic particles may be shaped (e.g., precisely-shaped) or random (e.g., crushed and/or platey). Shaped ceramic particles and precisely-shaped ceramic particles may be prepared by a molding process using sol-gel technology as described, for example, in U.S. Pat. No. 5,201,916 (Berg), U.S. Pat. No. 5,366,523 (Rowenhorst (Re 35,570)), U.S. Pat. No. 5,984,988 (Berg), U.S. Pat. No. 8,142,531 (Adefris et al.), and U.S. Pat. No. 8,764,865 (Boden et al.).

U.S. Pat. No. 8,034,137 (Erickson et al.) describes ceramic alumina particles that have been formed in a specific shape, then crushed to form shards that retain a portion of their original shape features. In some embodiments, the ceramic particles are precisely-shaped (i.e., the ceramic particles have shapes that are at least partially determined by the shapes of cavities in a production tool used to make them).

Exemplary shapes of ceramic particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms). In some embodiments (e.g., truncated pyramids and prisms), the ceramic particles respectively comprise platelets having two opposed major facets connected to each other by a plurality of side facets.

In some embodiments, the ceramic particles preferably comprise crushed abrasive particles having an aspect ratio of at least 2, at least 3, at least 5, or even at least 10.

Preferably, ceramic particles used in practice of the present disclosure have a Mohs hardness of at least 6, at least 7, or at least 8, although other hardnesses can also be used.

Further details concerning ceramic particles suitable for use as abrasive particles and methods for their preparation can be found, for example, in U.S. Pat. No. 8,142,531 (Adefris et al.), U.S. Pat. No. 8,142,891 (Culler et al.), and U.S. Pat. No. 8,142,532 (Erickson et al.), and in U.S. Pat. Appl. Publ. Nos. 2012/0227333 (Adefris et al.), 2013/0040537 (Schwabel et al.), and 2013/0125477 (Adefris).

In a subsequent step, the method comprises coating the outer surface of the ceramic particles with an aqueous solution. The aqueous solution comprises a (e.g. soluble) polyionic material, such as waterglass. In one embodiment, the outer surfaces of the ceramic particles are moistened with waterglass to provide moistened ceramic particles. This step can be accomplished by any suitable method such as, for example, mixing dry ceramic particles with a small amount of water glass that is sufficient to moisten the ceramic particles, or immersing the ceramic particles in waterglass and removing excess waterglass to provide moistened ceramic particles. This step results in forming polyion-coated ceramic particles.

Typically, the entire outer surface of each ceramic particle is moistened in this step; however, this is not a requirement. Mixing may be accomplished by mechanical methods (e.g., a mixer), for example. Removal of excess waterglass may be accomplished by suction, evaporation, or other suitable method, for example.

The ceramic particles are generally coated with an aqueous solution comprising a polyionic material. An ionic compound is a chemical compound composed of ions held together by electrostatic forces termed ionic bonding. The compound is neutral overall, but consists of positively charged cations and negatively charged anions. Ionic compounds containing hydrogen ions (H) are classified as acids, and those containing basic ions hydroxide ($OH^-$) or oxide ($O^{2-}$) are classified as bases. Ionic compounds without these ions are also known as salts and can be formed by acid-base reactions.

A polyionic material refers to a material comprising two or more ionic moieties that are attached to each other through covalent bonds. Polyanionic materials comprise more than one anion. Common anions include, for example, carbonate, silicate, sulfate, sulfite, phosphate, phosphite, etc.

In some embodiments, the polyionic material is a compound, typically having a molecular weight no greater than 1000 g/mole. Alternatively, the polyionic material may be an oligomer or polymer having a higher molecular weight.

One example of an aqueous solution that comprises a polyionic material is waterglass. As used herein, the term "waterglass" refers to an aqueous solution of alkali silicate(s) (e.g., lithium, sodium, and/or potassium silicate) and combinations thereof. Alkali silicate is the common name for compounds with the formula $(SiO_2)_n(M_2O)$ and their hydrates where n is a positive integer and M is an alkali metal (e.g., sodium or potassium). Notably alkali silicate comprises more than one oxide ion and thus can be characterized as a polyanion.

Another class of polyionic compounds are phosphonocarboxylic acids and salts thereof. The phosphonocarboxylic acid may have one or more phosphono groups (—PO(OH)$_2$). The phosphonocarboxylic acid may have one or more carboxyl groups (—COOH). The phosphonocarboxylic acid may optionally contain further functional groups, examples being one or more hydroxyl groups. The phosphonocarboxylic acid is typically an aliphatic carboxylic acid or an aliphatic hydroxycarboxylic acid, in each case having at least one phosphono group and 1, 2, 3, 4 or more carboxyl groups, with 2 and more carboxyl groups being preferred.

Suitable examples of phosphonocarboxylic acids which can be employed are monophosphonocarboxylic acids of the general formula R1R2C(PO$_3$H$_2$)CO$_2$H, in which R1 and R2 may be identical or different and are independently selected from —H, —OH, —CH$_3$, —C$_2$H$_5$, —C$_3$H$_7$, —CH(CO$_2$H), —CH$_2$CO$_2$H, —CH$_2$, —(CH$_2$)$_n$ and —CO$_2$H, in which n is an integer from 0 to 18, and diphosphonoalkanecarboxylic acids of the general formula R3R4C(PO$_3$H$_2$)$_2$, in which R3 and R4 may be identical or different and are independently selected from the same group as R1 and R2 just described provided that at least one of the radicals R3 and R4 being a group having at least one radical —CO$_2$H, and also salts of these monophosphonocarboxylic acids and diphosphonoalkanecarboxylic acids.

Examples of specific suitable phosphonocarboxylic acids are phosphonoacetic acid, 2-carboxyethanephosphonic acid, 2-hydroxy-2-phosphonoacetic acid, 2-phosphono-1,2,4-butanctricarboxylic acid (PBTC), and salts thereof 2-phosphono-1,2,4-butanctricarboxylic acid and its salts are particularly preferred and are available commercially. For example, a 50% strength aqueous solution of 2-phosphono-1,2,4-butanetricarboxylic acid (Bayhibit (Registered trademark) AM), or the tetrasodium salt of 2-phosphono-1,2,4-butanetricarboxylic acid (Bayhibit (Registered trademark) S), is sold by Lanxess AG.

Water is typically the primary liquid component of the aqueous solution. In such embodiment, the aqueous solution comprises at least 50, 60, 70, 80, 90, 95 wt.-% or greater of (e.g. deionized) water. The aqueous solution may also comprise organic co-solvents (e.g., methanol, ethanol, isopropanol, glyme, diglyme, propylene glycol, and/or acetone) may also be present. In some embodiments, the liquid component of the aqueous solution may comprise less than 50 wt.-% water. For example, the amount of water may be 10, 20, 30, or 40 wt.-% of the liquid components of the aqueous solution. Other components such as, for example, surfactant(s), thickener(s), thixotrope(s), and colorant(s), may be included in the waterglass if desired.

The concentration of alkali silicate in the waterglass is not critical (as long as it is dissolved and the waterglass is liquid), but it is preferably from 25 to 70 percent by weight, more preferably 30 to 55 percent by weight. In this context, percent by weight is to be calculated based on the anhydrous form of alkali silicate(s) that is/are present in the waterglass.

The ceramic particles generally comprise a metal oxide that is capable of acting as an acid/and or base in the presence of water. In some embodiments, the ceramic particles comprise aluminum oxide, or in other words alumina. For example, in some embodiments, the ceramic particles comprise at least 50, 60, 70, 80, 90, 95, or even 100% alumina. When the ceramic particles comprise less than 100 wt.-% alumina, the remainder of the ceramic particles is typically a metal oxide.

Alumina is an amphoteric substance, meaning it can react with both acids and bases.

Without intending to be bound by theory, it is surmised that alumina acts as an acid bonding to the silicate. The silicate in turn acts as a base, thereby bonding with the metal ion (e.g. iron) of the magnetic particles. Thus, the magnetic particles are ionically bonded to the ceramic particles by means of a polyion. In this example, the polyion is silicate, a polyanion.

As another example 2-phosphonobutane-1,2,4-tricarboxylic acid sodium salt depicted as follows, can also be utilized.

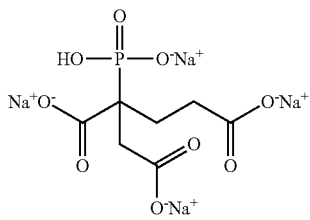

Without intending to be bound by theory, it is surmised that alumina acts as an acid bonding to the carboxylate and/or oxide groups of the PBTC. The carboxylate and/or oxide groups of the PBTC salt also bond with the metal ion (e.g. iron) of the magnetic particles. Thus, the magnetic particles are ionically bonded to the ceramic particles by means of a polyion. In this example, the polyion is a polyanion.

As yet another example, glyphosate isopropylamine salt has structural features of both amine and hydroxyl groups as evident by the following formula:

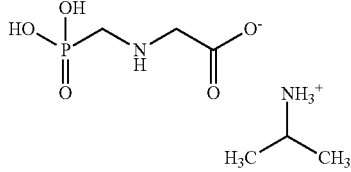

Without intending to be bound by theory, it is surmised that alumina acts as an acid bonding to the negatively charged groups of the glyphosate isopropylamine. The negatively charged groups of the glyphosate isopropylamine also bond with the metal ion (e.g. iron) of the magnetic particles. Thus, the magnetic particles are ionically bonded to the ceramic particles by means of a polyion. In this example, the polyion is a polyanion.

One of ordinary skill in the art can select a suitable polyion depending on the composition of the ceramic particles and magnetic particles. Unlike vitreous binders the polyionic material (e.g. silicate) is not sintered and therefore does not form a glass. Additionally, the aqueous solution comprising the polyionic material utilized to coat the ceramic particles does not typically further comprise glass frit.

In some embodiments, the magnetizable ceramic particles comprise no greater than 5, 4, 3, 2, or 1 wt.-% of polyanion.

The magnetic particles comprise magnetizable material such as, for example: iron; cobalt; nickel; various alloys of nickel and iron marketed as Permalloy in various grades; various alloys of iron, nickel and cobalt marketed as Femico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite ($Fe_3O_4$); zinc ferrite; nickel ferrite; cobalt ferrite, magnesium ferrite, barium ferrite, and strontium ferrite; yttrium iron garnet; and combinations of the foregoing. In some preferred embodiments, the magnetizable material comprises at least one metal selected from iron, nickel, and cobalt, an alloy of two or more such metals, or an alloy of at least one such metal with at least one element selected from phosphorus and manganese. In some preferred embodiments, the magnetizable material is an alloy containing 8 to 12 weight percent (wt. %) aluminum, 15 to 26 wt. % nickel, 5 to 24 wt. % cobalt, up to 6 wt. % copper, up to 1% titanium, wherein the balance of material to add up to 100 wt. % is iron.

According to the literature, $\alpha$-$Fe_2O_3$ (hematite) has a magnetic saturation (i.e. specific magnetization) of significantly less than 1 emu/g at standard temperature (0° C., 32° F., 273.15° K) with field strength of 5 kOe, 10 kOe, and 15 kOe (kilo oersteds). The magnetic saturation of the magnetic particles is preferably at least 1, 2, 3, 4, 5, 6, 7, 8, or 10 emu/g with a field strength of 18 kOe. In some embodiments, the magnetic saturation of the magnetic particles is greater than 10 with a field strength of 18 kOe such as at least 15, 20, 25, 30, 35, 40, 45, 50, 55, or 60 emu/g. In some embodiments, the magnetic saturation of the magnetic particles is at least 65 or 70 emu/g with a field strength of 18 kOe. In some embodiments, the magnetic saturation of the magnetic particles is at least 75, 80, 85, 90 or 95 with a field strength of 18 kOe. In some embodiments, the magnetic saturation of the magnetic particles is at least 100, 115, 120, 125, 130, or 135 emu/g with a field strength of 18 kOe. The magnetic saturation of the magnetic particles is typically no greater than 250 emu/gram. Higher magnetic saturation can be amenable to providing magnetizable ceramic particles with less magnetic particles per mass of ceramic particles. In some embodiments, the coercivity is less than 500 Oe (oersteds). In some embodiments, the coercivity is less than 350, 300, 250, 200, or 150 Oe. The coercivity is typically at least 1 Oe and in some embodiments at least 5, 10, 15, 20, 25, 30, 35, 40, 45, or 50 Oe.

The magnetic particles are preferably much smaller than the ceramic particles as judged by average particle diameter, preferably 4 to 2000 times smaller, more preferably 100 to 2000 times smaller, and even more preferably 500 to 2000 times smaller, although other sizes may also be used. In this embodiment, the magnetic particles may have a Mohs hardness of less than 6 (e.g., less than 5, or less than 4), although this is not a requirement.

In some embodiments, the magnetic particles may be characterized as nanoparticles. The magnetic nanoparticles have an average primary particle size diameter of less than 500, 450, 400, 350, 300, 250, or 200 nanometers. "Primary particle size" refers to the mean diameter of a single (non-aggregated, non-agglomerated) particle. In some embodiments, the nanoparticles have an average primary particle size of no greater than 150, 125, 100, 75, or 50 nanometers. The nanoparticles typically have an average primary particle size diameter of at least 5 or 10 nanometers. With regard to the methods described herein, the average particle size of the magnetic particle can be determined by gas adsorption (according to the test method described in the examples). When the magnetic particles are bonded to the abrasive particles, nanoparticle measurements can be based on transmission electron miscroscopy (TEM).

Magnetic particles are commercially available and can be prepared by techniques known in the art. In some embodiments, the magnetic particles are prepared by wet chemical or plasma torch techniques.

In one embodiment, after the ceramic particles are moistened with the waterglass (forming polyion-coated ceramic particles), the magnetizable particles are contacted with the moistened ceramic particles to provide powder-coated ceramic particles. This may be done in any suitable method including, for example, powder coating, mechanically mixing, or fluidized bed coating.

Other embodiments comprise combining the polyion-coated ceramic particles with magnetic particles while dispersed in an aqueous solution. The magnetic particle can be dispersed in an aqueous solution by any suitable technique. Suitable techniques include stirring magnetically with a PTFE coated stir bar and stirring mechanically with a PTFE blade attached to an overhead motor via a glass rod, speeds of about 500-1000 RPM.

In some embodiments, the method may be characterized as a two-step wet method. In this embodiment, the ceramic particles are first coated with the aqueous polyionic solution and subsequently the polyion-coated ceramic particles are dispersed in an aqueous solution to which the magnetic particles are added. The ceramic particles can be coated by any method including immersing the ceramic particles into a bath of the aqueous solution of polyion (e.g. dip coating) and spraying the aqueous solution of polyion onto the ceramic articles.

In other embodiments, the method may be characterized as a one-step wet method. In the one step method, the magnetic particles are dispersed in an aqueous solution comprising the (e.g. soluble) polyionic material. Thus, the aqueous medium concurrently contains both the dissolved polyionic material and the dispersed magnetic particles. This solution/dispersion is then utilized to coat the ceramic particles.

Regardless of whether the one-step or two-step wet method is employed, the ceramic particles and magnetic particles can be combined with each other using any suitable method including, for example, mechanically mixing, or fluidized bed coating. It is also contemplated that that magnetic particle dispersion (with or without the dissolved polyionic material) can be sprayed onto the ceramic particles while conveying the ceramic particles on a belt.

Preferably, an excess of the magnetizable particles is used in order to facilitate maximal coating of the moistened ceramic particles. The magnetizable particles bound to the ceramic core may be in direct contact with it, or they may be in indirect contact through intervening magnetizable particles to which they are bound. In some preferred embodiments, the magnetizable particles are in direct contact with the ceramic particles. The deposited magnetizable particles form a magnetizable layer (continuous or discontinuous) that is preferably from ⅒ to ¼ of the thickness of the ceramic particle, although this is not a requirement.

Excess magnetizable particles may be removed at this point or after drying, such as by heating, for example, as described below.

The magnetic particle-coated ceramic particles are dried, typically by being heated to at least a temperature sufficient to bond the magnetizable particles of the powder-coated ceramic particles to the respective ceramic particles on which they are coated, thereby providing the magnetizable abrasive particles. On a respective basis, each magnetizable abrasive particle comprises a ceramic particle having the magnetizable particles bonded thereto. Suitable heating temperatures will typically vary based on the composition of the ceramic particles and magnetizable particles. For sodium silicate waterglass and alumina ceramic particles, heating temperatures of at least 300° F. (149° C.) for a time of at least 30 minutes are typically sufficient, although higher and lower temperatures and/or times may also be used. Although such temperature is sufficient to remove the water to thereby provide dry magnetic-particle coated ceramic particles, such temperature is below the sintering temperature of the polyionic material (e.g. silicate ($SiO_4$)).

Magnetizable abrasive particles and/or ceramic particles used in their manufacture according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS 12, JIS 16, JIS24, JIS36, JIS46, JIS54, JIS60, JIS80, JIS 100, JIS 150, JIS 180, JIS220, JIS240, JIS280, JIS320, JIS360, JIS400, JIS600, JIS800, JIS 1000, JIS 1500, JIS2500, JIS4000, JIS6000, JIS8000, and JIS10,000.

Alternatively, magnetizable abrasive particles and/or ceramic particles used in their manufacture according to the present disclosure can be graded to a nominal screened grade using U.S. A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the ceramic particles pass through a test sieve meeting ASTM E-11 specifications for the number 18 sieve and are retained on a test sieve meeting ASTM E-11 specifications for the number 20 sieve. In one embodiment, the ceramic particles have a particle size such that most of the particles pass through an 18 mesh test sieve and can be retained on a 20, 25, 30, 35, 40, 45, or 50 mesh test sieve. In various embodiments, the ceramic particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+23 0, −230+270, −270+325, −325+400, −400+450, −450+500, or −500+635. Alternatively, a custom mesh size can be used such as −90+100.

In some embodiments, it has been found that certain ceramic particles can be preferentially coated on specific portions of their outer surfaces with the magnetizable particles. For example, alumina shaped abrasive particles that are formed by a molding process in which the ceramic particle precursor (e.g., alumina precursor) is dried while in an open-faced mold and removed to form a shaped particle precursor, may have higher affinity for bonding the magnetizable particles to the open (i.e., exposed) face of the shaped ceramic particle precursor while still in the mold than mold surfaces (i.e., surface(s) that contact the mold cavity wall(s)).

For example, referring now to FIG. 1, magnetizable abrasive particle 100 that has a ceramic particle 105 shaped as a truncated trigonal pyramid with opposed major surfaces 110 and 120 connected by sidewalls 130*a*, 130*b*, 130*c*. Major surface 120 corresponds to an open surface during manufacture of the ceramic particle, while the remaining surfaces all correspond to mold surfaces. Magnetizable particles 140 form a layer 150 and are bound to major surface 120.

Figure 2:
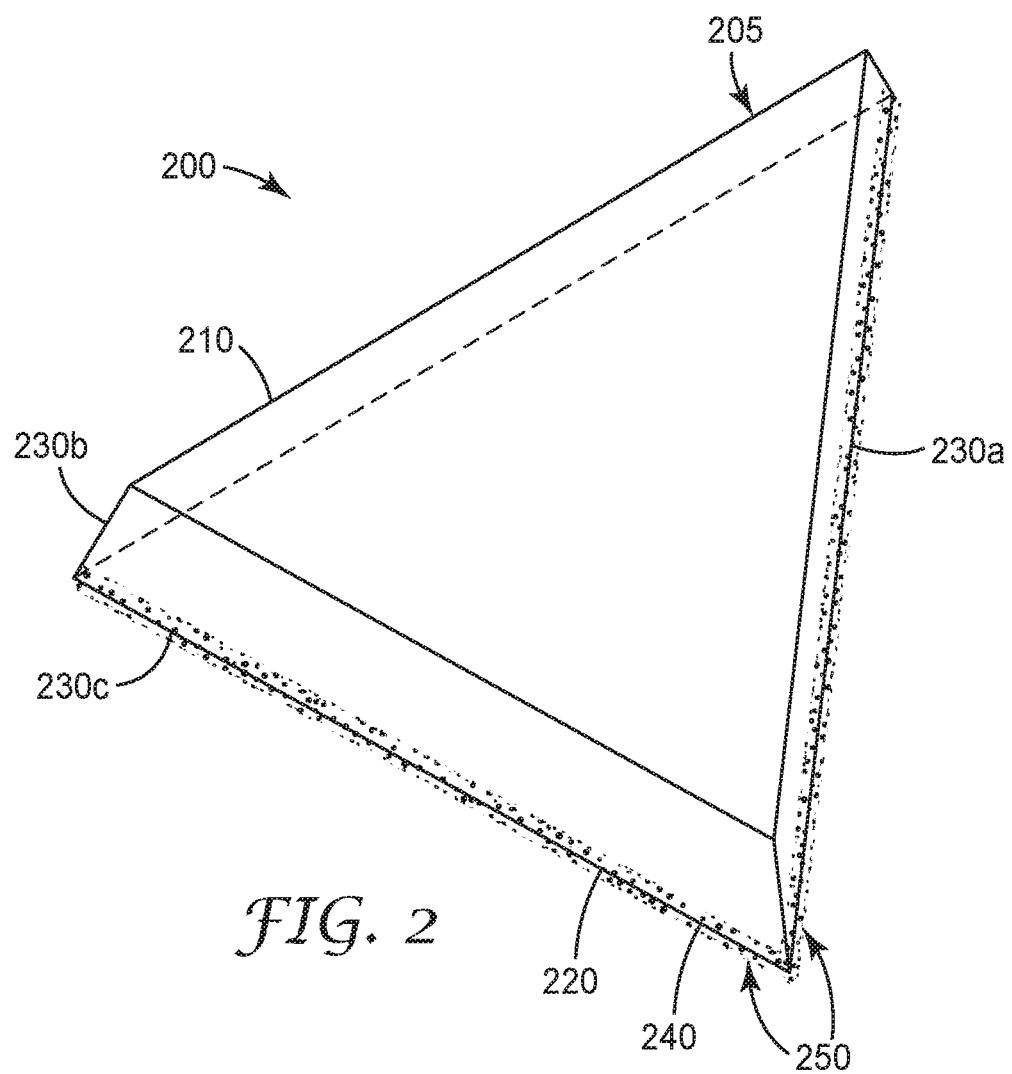
FIG. 2 is a schematic perspective view of an exemplary magnetizable abrasive particle 200 according to one embodiment of the present disclosure.
Figure 2A:
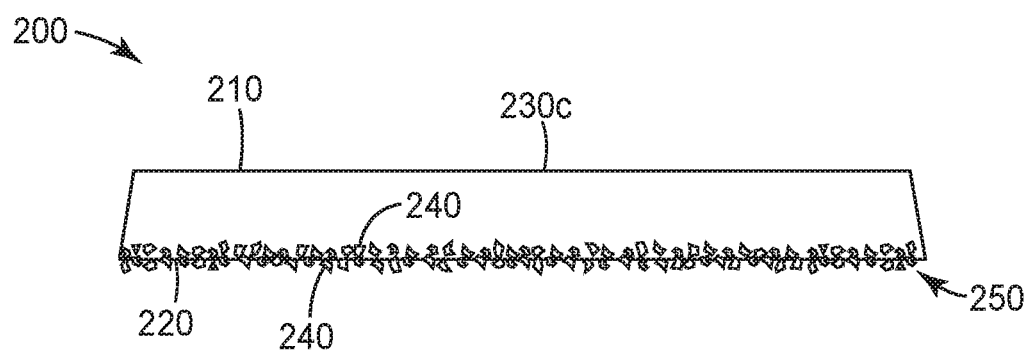
FIG. 2A is a schematic side view of magnetizable abrasive particle 200.

In certain embodiments, the magnetizable particles may also be bound to adjacent portions of the sidewalls. Referring now to FIG. 2, it shows a magnetizable abrasive particle 200 that has a ceramic particle 205 shaped as a truncated trigonal pyramid with opposed major surfaces 210 and 220 connected by sidewalls 230*a*, 230*b*, 230*c*. Major surface 220 corresponds to an open surface during manufacture of the ceramic particle, while the remaining surfaces all correspond to mold surfaces. Magnetizable particles 240 form a layer 250 and are bound to major surface 220 and adjacent portions of sidewalls 230*a*, 230*b*, 230*c*.

Without wishing to be bound by theory, the present inventors believe that differences in surface morphology during the drying step while still in the mold in the manufacture of the ceramic particles leads to the preferential deposition of the magnetizable particles. In particular, it is believed that surfaces exposed to air during drying become favored for later bonding with the magnetizable particles. In those cases where preferential deposition of the magnetizable particles on the open surface and portions of the sidewalls adjacent to it occurs, it is believed that shrinkage away from the mold cavity wall during drying results in an air interface and similar surface properties as the open surface during drying exposed.

In other embodiments, it has been found that one-step and two-step wet method of coating ceramic particles with magnetic particles utilizing a polyionic material as a bonding agent can reduce the agglomeration of the magnetic-particle coated ceramic particles thus formed.

Figure 8:
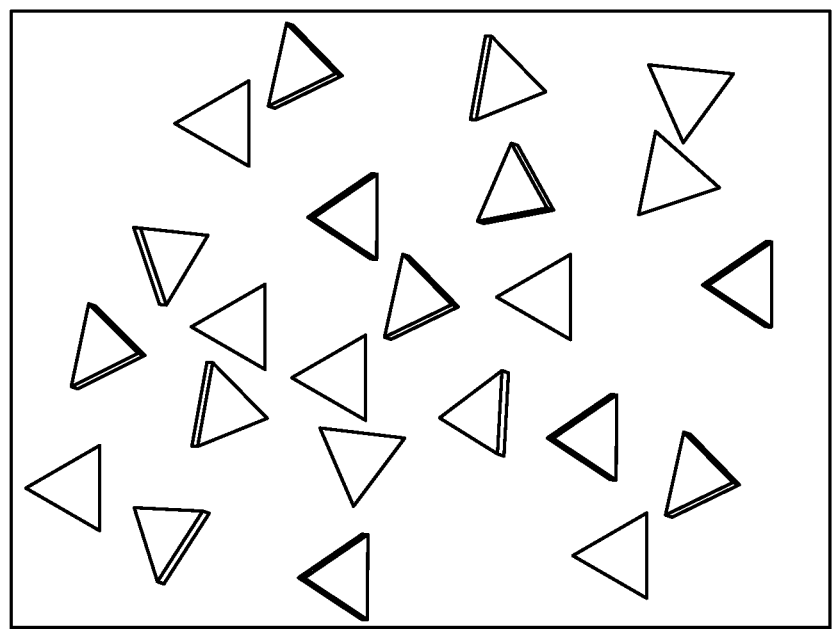
FIG. 8 is a schematic perspective view depicting unagglomerated magnetizable abrasive particle.
Figure 9:
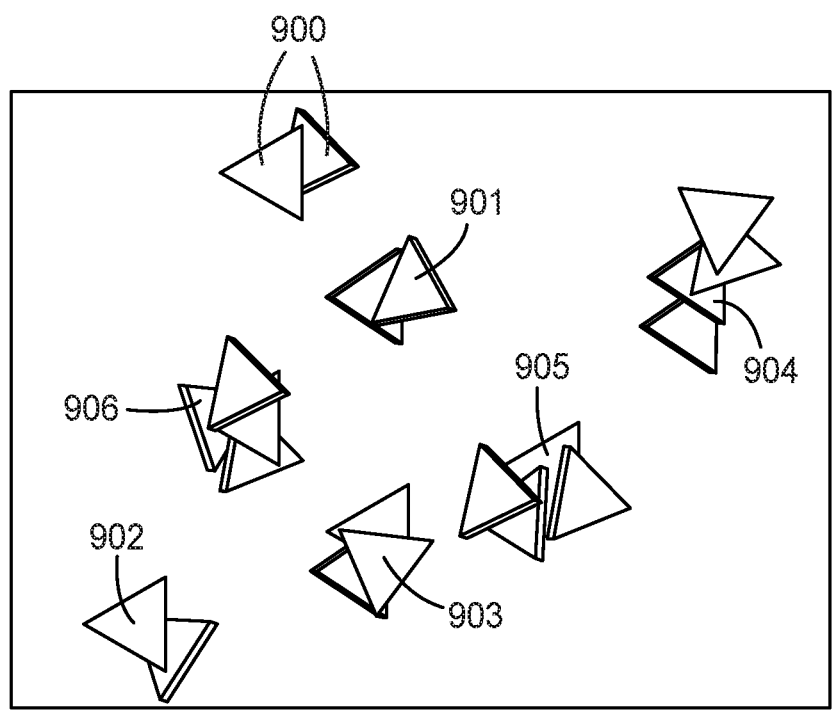
FIG. 9 is a schematic perspective view depicting agglomerated magnetizable abrasive particle.

An "agglomerate" refers to a weak association between primary particles which may be held together by charge or polarity and can be broken down into smaller entities. FIG. 9 depicts some examples of magnetizable abrasive particles in the form of agglomerates. The agglomerate comprises at least two magnetizable abrasive particle agglomerated to each other such as in the case of agglomerates 900, 901, and 902. In other embodiments, the agglomerates comprise three magnetizable abrasive particle agglomerated to each other such as in the case of agglomerates 903. In yet other embodiments, the agglomerate comprises four magnetizable abrasive particle agglomerated to each other such as in the case of agglomerates 904, 905, or 906. In yet other embodiments (not shown) the agglomerate can comprise more than four magnetizable abrasive particles agglomerated to each other. Agglomerated magnetizable abrasive particles cannot be oriented in the same manner as single, discreet, unagglomerated magnetizable abrasive particles. In some embodiments, a majority of the magnetizable abrasive particles (i.e. at least 50%) are present as discrete unagglomerated nanoparticles, such as depicted in FIG. 8. For example, at least 60%, 65%, 70%, 75%, 80%, 85%, or 90% or greater of the magnetizable abrasive particles are present as discrete unagglomerated nanoparticles.

Figure 7:
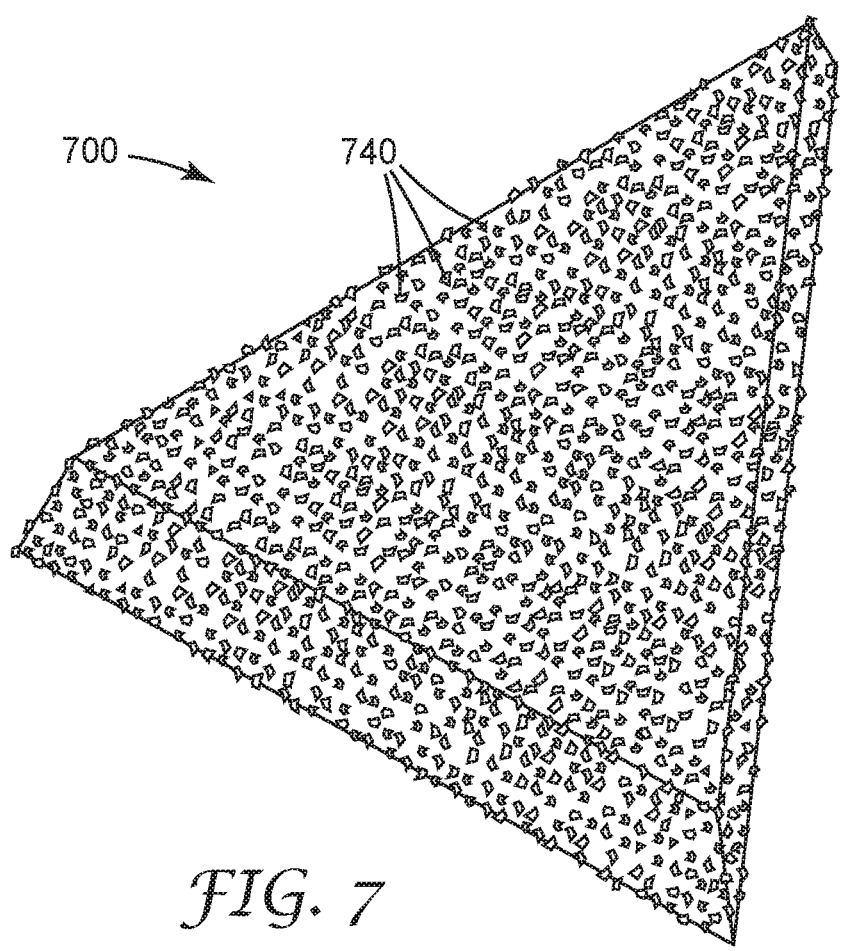
FIG. 7 is a schematic perspective view of an exemplary magnetizable abrasive particle 700 according to one embodiment of the present disclosure.
Figure 7A:
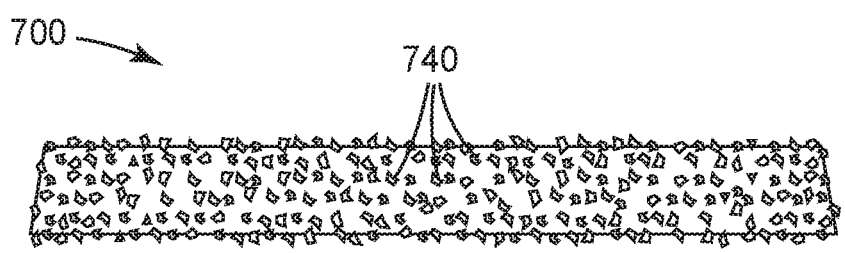
FIG. 7A is a schematic side view of magnetizable abrasive particle 700.

In other embodiments, the magnetizable abrasive particle 700 may include magnetic particles 740 (e.g. randomly) coated on the entire outer surfaces of the ceramic particles, as depicted in FIGS. 7 and 7A.

Magnetizable abrasive particles prepared according to the present disclosure can be used in loose form (e.g., free-flowing or in a slurry) or they may be incorporated into various abrasive articles (e.g., coated abrasive articles, bonded abrasive articles, nonwoven abrasive articles, and/or abrasive brushes). Due to their magnetic properties, the magnetizable abrasive particles can be oriented and manipulated using a magnetic field to provide the above various abrasive articles with controlled abrasive particle orientation and position.

In one embodiment, the method of making an abrasive article comprises a) applying the magnetizable abrasive particles described herein to the binder precursor;

b) applying a magnetic field to orient the magnetizable abrasive particles; and c) drying and/or curing the binder precursor sufficient to fix the respective orientations of the magnetizable abrasive particles.

In some embodiments, the binder precursor is disposed on a backing.

In some embodiments, steps b) and c) are sequential (and optionally consecutive). In some embodiments, steps b) and c) are simultaneous.

If no magnetic field is applied in step b), then the resultant magnetizable abrasive particles may not have a magnetic moment, and the constituent abrasive particles, or magnetizable abrasive particles may be randomly oriented. However, when a sufficient magnetic field is applied the magnetizable abrasive particles will tend to align with the magnetic field. In favored embodiments, the ceramic particles have a major axis (e.g. aspect ratio of 2) and the major axis aligns parallel to the magnetic field. Preferably, a majority or even all of the magnetizable abrasive particles will have magnetic moments that are aligned substantially parallel to one another.

The magnetic field can be supplied by any external magnet (e.g., a permanent magnet or an electromagnet). In some embodiments, the magnetic field typically ranges from 0.5 to 1.5 kOe. Preferably, the magnetic field is substantially uniform on the scale of individual magnetizable abrasive particles.

For production of abrasive articles, a magnetic field can optionally be used to place and/or orient the magnetizable agglomerate abrasive particles prior to curing the binder (e.g., vitreous or organic) precursor to produce the abrasive article. The magnetic field may be substantially uniform over the magnetizable abrasive particles before they are fixed in position in the binder or continuous over the entire, or it may be uneven, or even effectively separated into discrete sections. Typically, the orientation of the magnetic field is configured to achieve alignment of the magnetizable abrasive particles according to a predetermined orientation.

Examples of magnetic field configurations and apparatuses for generating them are described in U.S. Pat. No. 8,262,758 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British (G. B.) Pat. No. 1 477 767 (Edenville Engineering Works Limited).

In some embodiments, magnetic field may be used to deposit the magnetizable abrasive particles onto the binder precursor of a coated abrasive article while maintaining a vertical or inclined orientation relative to a horizontal backing. After drying and/or at least partially curing the binder precursor, the magnetizable abrasive particles are fixed in their placement and orientation. Alternatively or in addition, the presence or absence of strong magnetic field can be used to selectively place the magnetizable abrasive particles onto the binder precursor. An analogous process may be used for manufacture of slurry coated abrasive articles, except that the magnetic field acts on the magnetizable particles within the slurry. The above processes may also be carried out on nonwoven backings to make nonwoven abrasive articles.

Likewise, in the case of bonded abrasive article the magnetizable abrasive particles can be positioned and/or orientated within the corresponding binder precursor, which is then pressed and cured.

Magnetizable agglomerate abrasive particles can be used in loose form (e.g., free-flowing or in a slurry) or they may be incorporated into various abrasive articles (e.g., coated abrasive articles, bonded abrasive articles, nonwoven abrasive articles, and/or abrasive brushes).

Magnetizable agglomerate abrasive particles are useful, for example, in the construction of abrasive articles, including for example, coated abrasive articles (for example, conventional make and size coated abrasive articles, slurry coated abrasive articles, and structured abrasive articles), abrasive brushes, nonwoven abrasive articles, and bonded abrasive articles such as grinding wheels, hones and whetstones.

Figure 11:
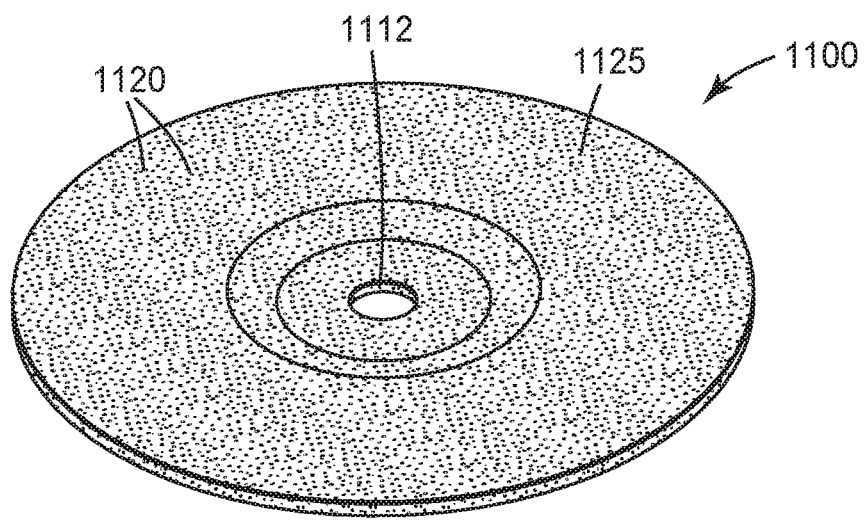
FIG. 11 is a perspective view of a bonded abrasive wheel 1100 according to the present disclosure.

For example, FIG. 11 shows an embodiment of a grinding wheel 1100, an embodiment of a bonded abrasive article. Center hole 1112 is used for attaching grinding wheel 1100 to, for example, a power driven tool. The grinding wheel 1100 comprises magnetizable agglomerate abrasive particles 1120 according to the present disclosure retained in binder 1125. Examples of suitable binders 1125 include: organic binders such as epoxy binders, phenolic binders, aminoplast binders, and acrylic binders.

Further details concerning the manufacture of bonded abrasive articles according to the present disclosure can be found in, for example, U.S. Pat. No. 4,800,685 (Haynes et al.); U.S. Pat. No. 4,898,597 (Hay et al.); U.S. Pat. No. 4,933,373 (Moren); and U.S. Pat. No. 5,282,875 (Wood et al.).

Figure 10:
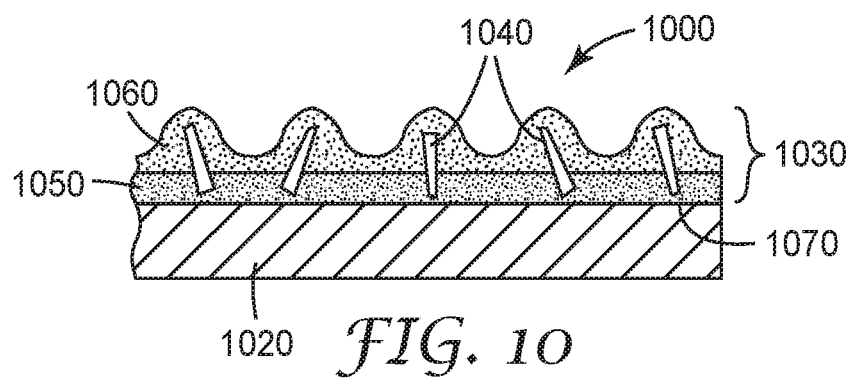
FIG. 10 is a side view of a coated abrasive article 1000 according to the present disclosure.

Referring to FIG. 10, an illustrative coated abrasive article 1000 has backing 1020 and abrasive layer 1030. Abrasive layer 1030, includes magnetizable abrasive particles 1040 according to the present disclosure secured to surface 1070 of backing 1020 by binder layer 1050. The coated abrasive article 1000 may further comprise an optional size layer 1060 that may comprise the same or different binder than binder layer 1050. Various binder layers for abrasive articles are known including, for example, epoxy resin, urethane resin, phenolic resin, aminoplast resin, or acrylic resin.

Further details concerning the manufacture of coated abrasive articles according to the present disclosure can be found in, for example, U.S. Pat. No. 4,314,827 (Leitheiser et al.), U.S. Pat. No. 4,652,275 (Bloecher et al.), U.S. Pat. No. 4,734,104 (Broberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

Figure 12A:
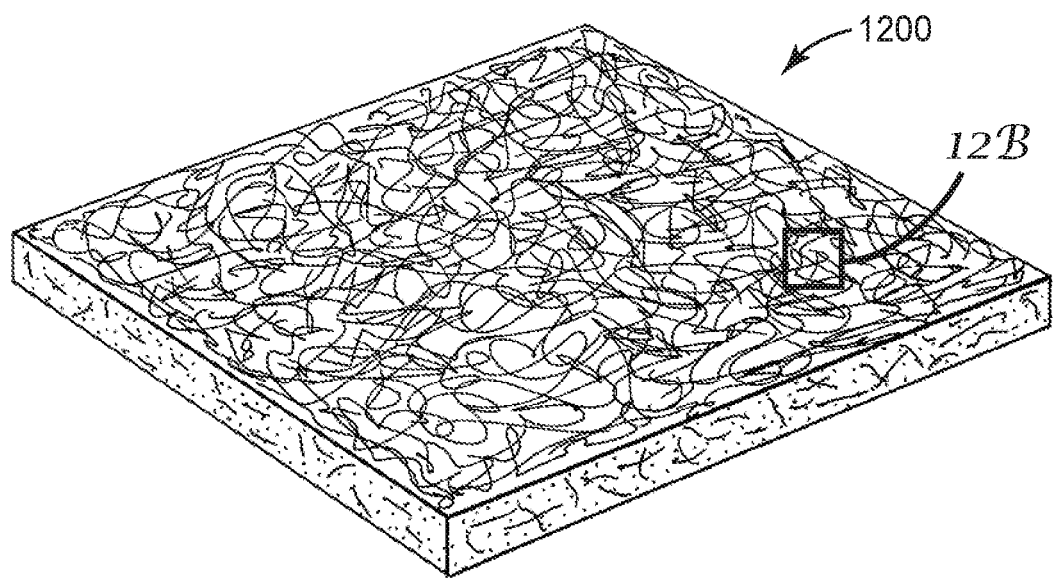
FIG. 12A is a perspective view of a nonwoven abrasive article 1200 according to the present disclosure.
Figure 12B:
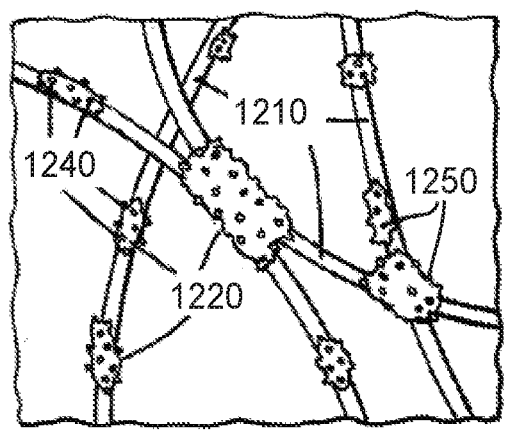
FIG. 12B is an enlarged view of region 12B in FIG. 12A.

Nonwoven abrasive articles typically include a porous (e.g., a lofty open porous) polymer filament structure having magnetizable agglomerate abrasive particles bonded thereto by a binder. An exemplary embodiment of a nonwoven abrasive article 1200 according to the present invention is shown in FIGS. 12A and 12B. Nonwoven abrasive article 1200 includes a lofty open low-density fibrous web formed of entangled filaments 1210 impregnated with binder 1220 (e.g., epoxy resin, urethane resin, phenolic resin, aminoplast resin, acrylic resin). Magnetizable abrasive particles 1240 according to the present disclosure are dispersed throughout fibrous web 1200 on exposed surfaces of filaments 1210. Binder 1220 coats portions of filaments 1210 and forms globules 1250, which may encircle individual filaments or bundles of filaments that adhere to the surface of the filament and/or collect at the intersection of contacting filaments, providing abrasive sites throughout the nonwoven abrasive article.

Further details concerning the manufacture of nonwoven abrasive articles according to the present disclosure can be found in, for example, U.S. Pat. No. 2,958,593 (Hoover et al.), U.S. Pat. No. 4,018,575 (Davis et al.), U.S. Pat. No. 4,227,350 (Fitzer), U.S. Pat. No. 4,331,453 (Dau et al.), U.S. Pat. No. 4,609,380 (Barnett et al.), U.S. Pat. No. 4,991,362 (Heyer et al.), U.S. Pat. No. 5,554,068 (Carr et al.), U.S. Pat. No. 5,712,210 (Windisch et al.), U.S. Pat. No. 5,591,239 (Edblom et al.), U.S. Pat. No. 5,681,361 (Sanders), U.S. Pat. No. 5,858,140 (Berger et al.), U.S. Pat. No. 5,928,070 (Lux), U.S. Pat. No. 6,017,831 (Beardsley et al.), U.S. Pat. No. 6,207,246 (Moren et al.), and U.S. Pat. No. 6,302,930 (Lux).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

Embodiments of the invention are as follows:

Embodiment 1

A method of making magnetizable abrasive particles, the method comprising steps:
a) providing ceramic particles, each ceramic particle having a respective outer surface;
b) coating the outer surfaces of ceramic particles with an aqueous solution comprising a polyionic material thereby forming polyion-coated ceramic particles; and
c) combining the polyion-coated ceramic particles with magnetic particles while dispersed in an aqueous solution thereby forming magnetic particle-coated ceramic particles;
d) drying the magnetic particle-coated ceramic particles in the absence of sintering the polyion.

Embodiment 2

The method of Embodiment 1, wherein step b) comprises immersing the ceramic particles in the aqueous solution.

Embodiment 3

The method of Embodiments 1-2, wherein after forming the polyion-coated ceramic particles, the method further comprises removing excess aqueous solution from the polyion-coated ceramic particles prior to step c).

Embodiment 4

The method of Embodiments 1-3, wherein step c) comprises applying an aqueous solution of the magnetic particles to the polyion-coated ceramic particles.

Embodiment 5

The method of Embodiment 4, wherein the aqueous solution of the magnetic particles is applied to at least one outer surface of the ceramic particles or applied to all the outer surfaces of the ceramic particles.

Embodiment 6

The method of Embodiment 1, wherein steps b) and c) are combined as one-step comprising coating the outer surfaces of the ceramic particles in the aqueous solution comprising the polyionic material wherein the aqueous solution further comprises the magnetic particles.

Embodiment 7

The method of Embodiments 1-6, wherein the outer surfaces of the ceramic particles comprise a continuous coating of polyion.

Embodiment 8

The method of Embodiments 1-7 wherein step c) comprises at least 5, 10, 15, 20, or 25 wt.-% of aqueous solution based on the total weight of polyion-coated ceramic particles and magnetic particles.

Embodiment 9

The method of Embodiments 1-8, wherein after forming the magnetic particle-coated ceramic particles, the method further comprises separating the magnetic particle-coated ceramic particles from excess aqueous solution.

Embodiment 10

The method of Embodiments 1-9, wherein the ceramic particles comprise a metal oxide that acts as an acid when combined with the aqueous solution comprising the polyionic material and the polyion is a polyanion.

Embodiment 11

The method of Embodiment 10, wherein the polyionic material is an alkali silicate or a phosphonocarboxylic acid or salt thereof.

Embodiment 12

The method of Embodiment 10, wherein the metal oxide comprises alumina.

Embodiment 13

The method of Embodiments 1-12, wherein the magnetic particles comprise at least one of iron or nickel.

Embodiment 14

The method of Embodiment 13, wherein the magnetic particles comprise an alloy comprising iron, silicon, and aluminum, an alloy of iron, silicon and nickel, or a ferrite.

Embodiment 15

The method of Embodiment 14 wherein the magnetic particles have a coercivity of less than 500 Oe.

Embodiment 16

The method of Embodiments 1-15 wherein the ceramic particle have an aspect ratio of at least 2.

Embodiment 17

The method of Embodiments 1-16, wherein the ceramic particles comprise ceramic platelets.

Embodiment 18

The method of Embodiment 17, wherein the ceramic platelets comprise a triangular major surface.

Embodiment 19

The method of Embodiment 17, wherein the ceramic platelets are shaped as truncated triangular pyramids.

Embodiment 20

The method of Embodiments 1-19 wherein the magnetic particles have an average primary particle size ranging from 50 to 250 nanometers.

Embodiment 21

The method of Embodiments 1-20 wherein the ceramic particles have a maximum dimension no greater than 2, 1.5, 1.0, 0.5, or 0.25 mm.

Embodiment 22

The method of Embodiments 1-21 wherein after drying the magnetic particle-coated ceramic particles have less than 25% agglomerated magnetic particle-coated ceramic particles.

Embodiment 23

The method of Embodiments 1-22 wherein the magnetic particles have a magnetic saturation of at least 10, 15, 20, 25, 30, 35, 40, 45 or 50 emu/gram.

Embodiment 24

Magnetizable abrasive particles prepared according to any one of Embodiments 1 to 23.

Embodiment 25

The magnetizable abrasive particles of Embodiment 24, wherein the magnetizable abrasive particles conform to an abrasives industry specified nominal grade.

Embodiment 26

Magnetizable abrasive particles comprising ceramic particles having outer surfaces comprising a coating of unsintered polyion and magnetic particles bonded to the polyion.

Embodiment 27

Magnetizable abrasive particles of Embodiment 26, wherein the polyion is selected from silicate, phosphonate, or carboxylate.

Embodiment 28

Magnetizable abrasive particles of Embodiments 26-27, wherein the metal oxide comprises alumina.

Embodiment 29

Magnetizable abrasive particles of Embodiments 26-28, wherein the magnetic particles comprise at least one of iron or nickel an alloy of iron, silicon and nickel, or a ferrite.

Embodiment 30

Magnetizable abrasive particles of Embodiment 29 wherein the magnetic particles have a coercivity of less than 500 Oe.

Embodiment 31

Magnetizable abrasive particles of Embodiments 26-30 wherein the ceramic particle have an aspect ratio of at least 2.

Embodiment 32

Magnetizable abrasive particles of Embodiments 26-31, wherein the ceramic particles comprise ceramic platelets.

Embodiment 33

Magnetizable abrasive particles of Embodiment 32, wherein the ceramic platelets comprise a triangular major surface.

Embodiment 34

Magnetizable abrasive particles of Embodiment 32, wherein the ceramic platelets are shaped as truncated triangular pyramids.

Embodiment 35

Magnetizable abrasive particles of Embodiments 26-34, wherein the magnetic particles have an average primary particle size ranging from 50 to 250 nanometers.

Embodiment 36

Magnetizable abrasive particles of Embodiments 26-35, wherein the ceramic particles have a maximum dimension no greater than 2, 1.5, 1.0, 0.5, or 0.25 mm.

Embodiment 37

Magnetizable abrasive particles of Embodiments 26-36, wherein the magnetizable abrasive particles comprise less than 25% of agglomerated magnetic particle-coated ceramic particles.

Embodiment 38

Magnetizable abrasive particles of Embodiments 26-37, wherein the magnetic particles have a magnetic saturation of at least 10, 15, 20, 25, 30, 35, 40, 45 or 50 emu/gram.

Embodiment 39

An abrasive article comprising a plurality of magnetizable abrasive particles according to Embodiments 26-38 retained in a binder material.

Embodiment 40

An abrasive article comprising the magnetizable abrasive particles according to Embodiments 26-38 retained in a binder material disposed on a backing.

Embodiment 41

A method of making an abrasive article, the method comprising steps:
a) applying the magnetizable abrasive particles according to Embodiments 26-38 to a binder precursor;
b) applying a magnetic field to orient the magnetizable abrasive particles; and
c) drying and/or curing the binder precursor sufficient to fix the respective orientations of the magnetizable abrasive particles.

Embodiment 42

The method of Embodiment 41 wherein the binder precursor is disposed on a backing.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Material abbreviations used in the Examples are listed in Tables 1 and 3, below.

TABLE 1

| ABBREVIATION | DESCRIPTION |
|---|---|
| SAP1 | Shaped abrasive particles prepared according to the Preparation of SAP1 procedure hereinbelow. |
| SAP2 | Shaped abrasive particles were prepared according to the disclosure of paragraph [0095] in U.S. Pat. No. 8,142,531 (Adefris et al.). The shaped abrasive particles were prepared by molding alumina sol gel in equilateral triangle-shaped polypropylene mold cavities. After drying and firing, the resulting shaped abrasive particles were about 2.5 millimeter (side length) × 0.5 millimeter (thickness), with a draft angle of approximately 98 degrees. |
| SIL | Sodium silicate, obtained as BW-50 from PQ Corporation, Malvern, Philadelphia |
| SUR | Surfactant, obtained as DOWFAX 2A1 from Dow Chemical Company, Midland, Michigan |
| MAG | Fe/Al/Si magnetizable alloy particles, obtained as SENDUST SP-3B from Mate Co., Ltd., Okayama Prefecture, Japan |

Preparation of SAP1

SAP1 was prepared generally according to the disclosure of U. S. Patent Publication No. 2015/0267097 (Rosenflanz et al). A slurry mixture was prepared using the following recipe: aluminum oxide powder (70.73 parts) obtained as RG 4000 from Almatis, Rotterdam, Netherlands, aluminum oxide monohydrate powder (7.07 parts) obtained as DISPERAL from Sasol North America, Houston, Tex., was dispersed by high shear mixing a solution containing water (21.57 parts) and 70% aqueous nitric acid (0.63 parts). The mixture was milled at 120 revolutions per minute for 24 hours. After milling, the milling media was removed and the slurry was degassed by placing it into a desiccator jar and applying a vacuum using mechanical pump (about 10 minutes hold under vacuum). The resulting slurry was poured onto a polyethylene tooling having triangular shaped mold cavities with a draft angle of 98 degrees between the sidewall and bottom of the mold. The tooling had a topical coating of mineral oil deposited by drying from a 5 weight percent ethanol solution. The slurry was spread into the cavities using a squeegee so that the openings of the production tooling were completely filled. The tooling containing the ceramic slurry was then dried under a heat gun. Following drying the sheet was vigorously shaken to dislodge the resulting shaped abrasive precursor particles. The shaped abrasive precursor particles were calcined by placing them in an alumina crucible and heating to 700° C. (heating rate 10° C. per minute) in air. No isothermal hold was applied. About 300 grams of the calcined shaped abrasive precursor particles were placed in an alumina crucible and sintered in a Model KKSK-666-3100 electrically heated furnace from Keith Furnaces of Pico Rivera, Calif., using a heating rate of 25° C. per minute and a hold time of 45 min at the final temperature approximately 1500-1550° C. The resulting shaped abrasive particles were about 2.5 mm (side length)×0.50 mm (thickness).

Surface Roughness Measurement

The surface roughness measurement was performed on both open face (the exposed face of the shaped particle precursor while still in the mold during the molding process) and mold face (the major surface that contacted the mold cavity bottom wall while still in the mold during sol-gel molding process) of SAP1 and SAP2. The test was measured as the average surface roughness (R) in micrometers using a Zeta Instruments Zeta-300 Optical Profilometer from Zeta Instruments, San Jose, Calif., according to the manufacturer's instructions. The test results of R, are shown in Table 2, below.

TABLE 2

| | AVERAGE SURFACE ROUGHNESS $R_a$, micrometers | |
|---|---|---|
| | OPEN FACE | MOLD FACE |
| SAP1 | 0.74 | 0.37 |
| SAP2 | 0.24 | 0.20 |

Example 1

A water glass mix was prepared by mixing 20 grams of SIL, 10 grams of water and 0.06 grams of SUR and stirring for approximately 1 minute. 125 grams of SAP1 and 1.5 grams of water glass mix were placed in to a container. After applying a lid to the container, the mixture was shaken vigorously by hand for 1 minute. Then 2.56 grams of MAG was added on top of the mixture in the container. The container was once again shaken by hand for about 1 minute. The mixture in the container was then poured out over an aluminum pan. The mixture was spread out as much as possible to prevent the mineral from binding together. The pan was placed in a solvent rated batch oven at the following cycle: 15 minutes at 200° F. (93.3° C.), 30 minutes at 250° F. (121.1° C.), 30 minutes at 300° F. (148.9° C.), and 30 minutes at 350° F. (176.7° C.).

Figure 3:
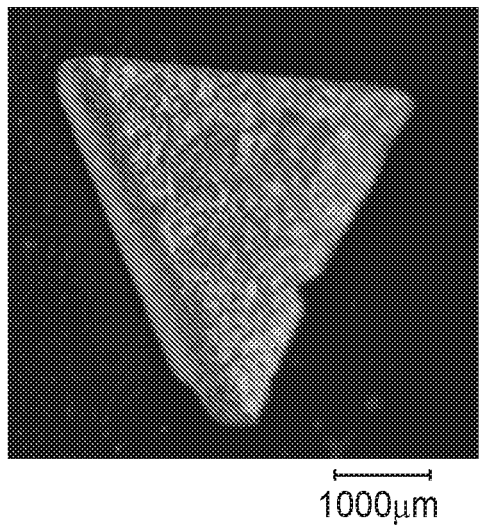
FIG. 3 is a digital photograph of a magnetizable abrasive particle prepared in Example 1 showing its open face.
Figure 4:
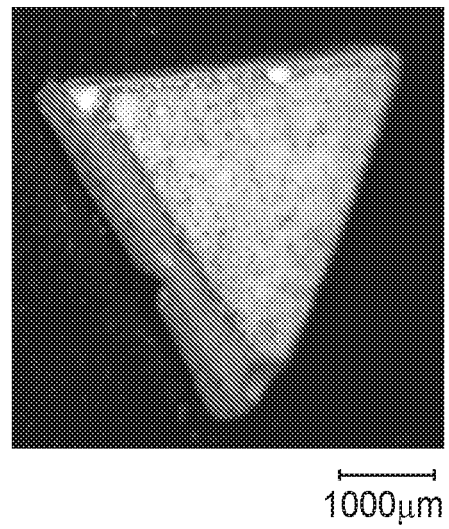
FIG. 4 is a digital photograph of a magnetizable abrasive particle prepared in Example 1 showing its mold face.
Figure 5:
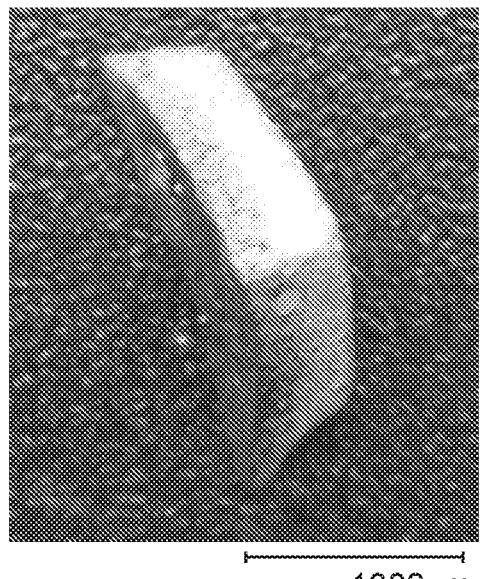
FIG. 5 a digital photograph of a magnetizable abrasive particle prepared in Example 1 showing its side view.

Digital photographs were taken of a representative resulting magnetizable abrasive particle to show the open face (see FIG. 3), mold face (see FIG. 4) and a side view (see FIG. 5). The amount of MAG coated on the open face of the magnetizable abrasive particle was much more than that coated on mold face of the magnetizable abrasive particle.

Example 2

Figure 6:
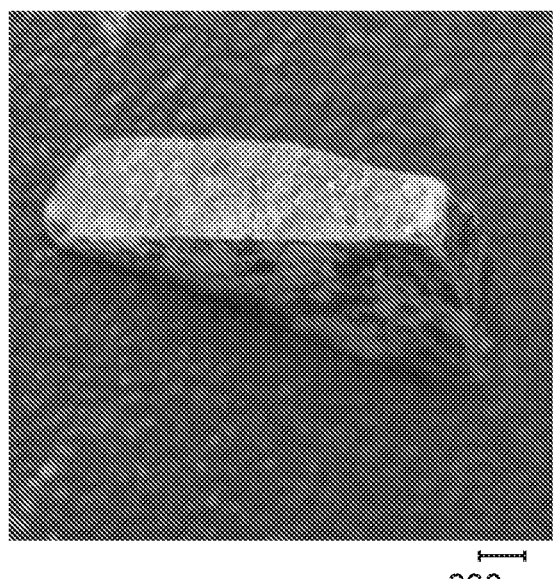
FIG. 6 is a digital photograph of a magnetizable abrasive particle made in Example 2.

The procedure generally described in Example 1 was repeated, except that SAP2 was used instead of SAP1. A representative resulting magnetizable abrasive particle is shown in FIG. 6.

In addition to Table 1, Table 3 also lists material abbreviations used in the Examples.

TABLE 3

| ABBREVIATION | DESCRIPTION | SOURCE |
|---|---|---|
| V800 | Semi-crystalline soft magnetic ribbon obtained under the trade designation VITROPERM 800 | Vacuumschmelze GmbH & Co, Hanau, Germany |
| Permalloy flake | Nickel, iron, molybdenum flake, −200 mesh; Ni:Fe:Mo; 81:17:2 wt % | Alfa Aesar, Ward Hill, MA |
| Ni(acac)$_2$ | Nickel(II) acetylacetonate (also called nickel(II) 2,4-pentanedionate), 95% | Alfa Aesar, Ward Hill, MA |
| 1,2-hexadecanediol | 1,2-hexadecanediol, technical grade, 90% | Sigma-Aldrich Corporation, Inc., St. Louis, MO |
| Tri-n-octylphosphine | tri-n-octylphosphine, technical grade, 90% | Alfa Aesar, Ward Hill, MA |
| Iron pentacarbonyl | iron carbonyl, technical grade, 95% | Gelest, Inc., Morrisville, PA |
| Dioctyl ether | Di-n-octyl ether, >95% | TCI Co., LTD., Tokyo, Japan |
| EtOH | Ethyl alcohol, denatured, anhydrous | EMD Millipore Corp., Darmstadt, Germany |
| Heptane | Heptane, suitable for general laboratory use | VWR International, Radnor, PA |
| SAP3 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles, which were shaped as truncated triangular pyramids, were about 1.4 mm (side length) × 0.35 mm (thickness), with a draft angle approximately 98 degrees. The shaped abrasive particles were then coated with inorganic material according to the method described in U.S. Pat. No. 5,213,591 (Celikkaya et al). | 3M Company, St. Paul, MN |
| SAP4 | SAP4 was prepared in a similar manner to SAP3 only using smaller equilateral triangle-shaped polypropylene mold cavities. After drying and firing, the resulting shaped abrasive particles, which were shaped as truncated triangular pyramids, were about 0.33 mm (side length) × 0.10 mm (thickness), with a draft angle approximately 98 degrees. | 3M Company, St. Paul, MN |
| SAP5 | SAP5 was prepared in a similar manner to SAP3 only using smaller equilateral triangle-shaped polypropylene mold cavities. After drying and firing, the resulting shaped abrasive particles, which were shaped as truncated triangular pyramids, were about 0.17 mm (side length) × 0.04 mm (thickness), with a draft angle approximately 98 degrees. | 3M Company, St. Paul, MN |
| SAP6 | SAP6 was prepared in a similar manner to SAP3 only using smaller equilateral triangle-shaped polypropylene mold cavities. After drying and firing, the resulting shaped abrasive particles, which were shaped as truncated triangular pyramids, were about 0.05 mm (side length) × 0.01. mm (thickness), with a draft angle approximately 98 degrees. | 3M Company, St. Paul, MN |
| Sodium hydroxide | Sodium hydroxide, pellets | EMD Millipore Corp., Darmstadt, Germany |
| L25 | Aqueous 23 wt.-% lithium silicate solution obtained under the trade designation LITHISIL 25 LITHIUM SILICATE SOLUTION, $(SiO_2)_n:(M_2O)$ is 4.1:1 | PQ Corporation, Valley Forge, PA |
| Permalloy nanopowder SA | Iron-nickel alloy, <100 nm (BET), ≥97% | Sigma-Aldrich Corporation, Inc., St. Louis, MO |
| BSG | 2-phosphonobutane-1,2,4-tricarboxylic acid sodium salt; phosphonate detergent obtained under the trade designation BAYHIBIT S-GRANULATE | Kurt Obermeier GmbH, Bad Berleburg, Germany |
| GISS | Glyphosate isopropylamine salt solution obtained under the trade designation ROUNDUP | Monsanto Company, St. Louis, MO |
| P100 | Ultra pure synthetic magnetite obtained under the trade designation PIROX-100 | Pirox, LLC, New Brighton, PA |
| B9012 | Solvent-free wetting and dispersing additive obtained under the trade designation BYK-W 9012 | BYK-Chemie GmbH, Wesel, Germany |
| D2012 | Wetting and dispersing additive for aqueous coatings and printing inks obtained under the trade designation DISPERBYK-2012 | BYK-Chemie GmbH, Wesel, Germany |
| YF coated backing | Untreated polyester cloth having a weight of 300-400 grams per square meter (g/m$^2$), obtained under the trade designation POWERSTRAIT | Milliken & Company, Spartanburg, S.C. |
| Phenolic resin | Obtained as GP 8339 R-23155B | Georgia Pacific Chemicals, Atlanta, GA |

Gas Adsorption Test Method

Nitrogen sorption isotherms were collected on a Micromeritics ASAP 2020 surface area and porosity analyzer at 77 K (Micromeritics Instrument Corp., Norcross, Ga.). Samples were degassed under vacuum at 200° C. for 3 hours to remove any moisture or adsorbed contaminants that may have been present on the surface. For surface area calculations (e.g. particle size), the Braunauer-Emmett-Teller (BET) model was applied to the desorption branch. Results are summarized in Table 4.

TABLE 4

Particle size & Magnetic Properties of Magnetic Particles

| Sample | Description | Particle Diameter (nm) | Coercivity (Oe) | Magnetic saturation (emu/g) |
|---|---|---|---|---|
| V800 nanoparticles (PE-1) | Plasma torch processed V800 | 209 | 114 | 134 |
| Permalloy flake nanoparticles (PE-2) | Plasma torch processed permalloy flake | 138 | 162 | 98 |
| Permalloy nanopowder SA | Iron-nickel alloy from Sigma-Aldrich | 43 | 417 | 72 |
| Permalloy nanopowder (PE-3) | Iron-nickel alloy from the reduction of precursors | Not measured | 126 | 64 |

Magnetic Properties Test Method

The magnetic properties of the magnetic particles (powders) were tested at room temperature with vibrating sample magnetometer (VSM) Lake Shore 7400 (Lake Shore Cryotronics, Inc., Westerville, Ohio). The mass of the magnetic particles was measured prior the magnetic measurements (model: MS105DU, Mettler Toledo, Switzerland). For each sample, a new VSM holder was used. The mass of the empty VSM sample holder, similar to a Lake Shore Model 730935 (P/N 651-454), was used to zero the balance. After the magnetic particles were loaded into the same VSM sample holder (into the ~15 mm dip tap of the holder), the pure mass of powder was measured. In order to secure the powder in the tap of the holder, adhesive (3M Scotch-Weld clear adhesive ID No. 62-3801-0330-9) was applied. The adhesive dried for at least 4 hours prior to the measurement. The magnetic moment (emu) of the magnetic particles was measured at magnetic field H=18 kOe. The mass magnetization $M_m$ (emu/g) was calculated by dividing measured magnetic moment to the mass of the magnetic particles. The volume magnetization for powders $M_v$ (emu/cc) was calculated by multiplying mass magnetization $M_m$ to the measured powder mass density ρ. For magnetic powders measured coercive force $H_c$ (Oe) and remanent magnetization $M_r/M_v$ (relative to $M_v$) was also recorded. These values were taken from the magnetization loops recorded by sweeping magnetic field H from +20 to −20 kOe. The sweeping speed of the magnetic field H for each measurement was 26.7 Oe/s.

Preparatory Example 1 and Preparatory Example 2 (PE-1 and PE-2)

Nanoparticle Synthesis Via Plasma Torch Process

Nanoparticles were synthesized in a radio frequency (RF) plasma reactor consisting of a plasma torch head, a gas expansion and reaction vessel (sphero-reactor), a cyclone separator, and porous metal filters (TekNano 15, Tekna, Sherbrooke, Quebec, Canada). A 15 kilowatt (kW) RF power supply was used to energize the torch head with 2.2 ampere (A) delivered at 6.7 kilovolt (kV) and 300 megahertz (MHz). The torch head consisted of an inner quartz tube surrounded coaxially by a ceramic heat shield. Water-cooled copper coils outside the larger ceramic tube inductively coupled the RF energy to the plasma gas in the inner quartz tube. A high flow rate gas sheath between the inner and outer tube minimized heat transfer to the torch body. Argon (Ar) gas flowing at 10 standard liters per minute (slpm) was used as the plasma gas while the sheath gas consisted of 35 slpm of Ar mixed with 4 slpm of hydrogen and 4 slpm of Ar at the window. Metal feedstock powders were fed into the system with a vibratory feeder and entrained in a 5 slpm Ar flow and injected axially into the gas stream just above the plasma via a tubular injection probe at a rate of 1.25 grams per minute (g/min) for the V800 (semi-crystalline soft magnetic ribbon obtained under the trade designation VITROPERM 800 obtained from Vacuumschmelze GmbH & Co, Hanau, Germany). The torch was operated for 50 minutes continuously during powder collection, producing approximately 50 grams (g) of product in the 50-minute timeframe. The pressure in the reactor vessel during synthesis was maintained at 15 pounds per square inch (psi) by a water pump vacuum system. The permalloy flake (nickel, iron, molybdenum flake obtained from Alfa Aesar, Ward Hill, Mass.) was treated using the same conditions given above but the feed rate of the flakes was decreased to 0.75 g/min.

The resulting nanoparticles synthesized via the plasma torch process using V800 will be referred to as V800 nanoparticles (PE-1) in the subsequent text. The V800 nanoparticles are crystalline as a result of being processed with the plasma torch. The resulting nanoparticles synthesized via the plasma torch process using permalloy flakes will be referred to as permalloy flake nanoparticles (PE-2) in the subsequent text.

Preparatory Example 3 (PE-3): Nanoparticle Synthesis Via Reduction Chemistry

Under inert conditions, nickel(II) acetylacetonate (Ni (acac)$_2$) (4 equivalents (equiv.), 1.623 g, 6.000 mmol, 95 mass %), 1,2-hexadecanediol (8 equiv., 3.446 g, 12.00 mmol, 90 mass %), and dioctyl ether (75 mL, 60.5 g, 247 mmol, 99 mass %) were stirred with magnetic stirring and heated to 100° C. for 40 minutes. During this step, the flask was continuously purged with nitrogen to remove oxygen, water, and other low boiling impurities. Tri-n-octylphosphine (2.00 equiv., 1.235 g, 3.000 mmol, 90 mass %) and iron pentacarbonyl (1.500 mmol, 0.295 g, 1.500 mmol, 99.5 mass %) were added in that order (the mixture turned a darker green immediately following the addition of the phosphine) and the mixture was heated to reflux (~265° C.). The refluxing was continued for 60 minutes. The heat source was then removed, and the reaction mixture cooled to room temperature overnight. After cooling overnight, the inert gas protected system could be opened to ambient environment. The reaction mixture was diluted by adding heptane (75 millileters (mL)) and separated by centrifugation. The diluted reaction mixture was then added to three 50 mL polypropylene centrifuge tubes along with the heptane washes of the reaction flask. These were then centrifuged, decanted, and washed several times with the following volumes of solvent and times in the centrifuge (all centrifugation was done at 6000 revolutions per minute (rpm) for 30-15 minutes): 1) heptane (~80 mL added to reaction mixture), 30 minutes; 2) EtOH (160 mL total), 20 minutes; 3) heptane (160 mL), 15 minutes. Yellow-brown supernatant was discarded. After the final wash, the resulting black particles were dried in a vacuum oven at 60° C. for 3 days.

The resulting nanoparticles synthesized via reduction chemistry will be referred to as permalloy nanopowder (PE-3) in the subsequent text.

Preparatory Example 4 (PE-4)

A polyionic binding solution was prepared using water glass chemistry by mixing 20 g SIL (sodium silicate solution obtained under the trade designation BW-50 from PQ Corporation, Valley Forge, Pa.), 20 g water, and 5 drops SUR (surfactant obtained under the trade designation DOWFAX 2A1 from Dow Chemical Company, Midland, Mich.).

The above solution was used to modify and attach magnetic particles to the shaped abrasive particles using the procedures described in the examples below.

Preparatory Example 5 (PE-5)

A milled dispersion of ultra-pure synthetic magnetite (PIROX-100 from Pirox, LLC, New Brighton, Pa.) was prepared by mixing 600 grams (g) water, 250 g PIROX-100, and 6.25 g BYK-W 9012 (solvent-free wetting and dispersing additive obtained under the trade designation BYK-W 9012 from BYK-Chemie GmbH, Wesel, Germany). The components were charged into a double-wall jacketed stainless steel mixing vessel and mixture was agitated with a Cowles blade connected to an air motor.

Milling was performed using a Hockmeyer Immersion Micromill (Hockmeyer, Harrison, N.J.) fitted with a 0.25 millimeter (mm) separation screen, 8-peg impeller, marine prop agitator and loaded with 155 g of 0.5 mm yttrium-stabilized zirconia beads (Torayceram Beads, Toray Industries, Inc). The milling was run for 4 hours at 2000 rpm. The magnetite concentration was estimated to be ~30 wt %. The resulting sample had a particle size distribution with mean particle size of 3.48 micrometers ($\mu$m) and D90 of 5.43 $\mu$m (90% of the particles is below 5.43 um based on volume distribution).

Preparatory Example 6 (PE-6)

A magnetic ink formulation was prepared by mixing 4.92 g PE-1 V800 nanoparticles, 2.05 g L25, 0.35 g D2012 (wetting and dispersing additive for aqueous coatings and printing inks obtained under the trade designation DISPERBYK-2012 from BYK-Chemie GmbH, Wesel, Germany), and 50 g water in a glass jar. The mixture was then then sonicated with a 1" (2.54 cm) probe at full power (~35% output) with 30 second pulses and a 10 second rest in between pulses for a total of 30 minutes of active pulse time or 40 minutes of elapsed time (Model: VC505, Sonics and Materials, Inc., Newtown, Conn.).

Example 3 (EX-3)

To a 20 dram vial was added 2.0 g of SAP4 (shaped abrasive particles with dimensions of 0.33 mm on each side) and 2.0 g of the PE-4 polyionic binding solution described above. This was stirred for 4 hours and filtered to remove the excess polyionic binding solution, but it was not rinsed. To the collected abrasive grains was added water (2 milliliters (mL)) and 20 milligrams (mg) of PE-1 V800 nanoparticles from plasma torch processing. This was stirred overnight (about 16 hours) and the shaped abrasive particles were collected by filtration. This was dried in an oven at 120° C. for several hours. A magnetic response was observed at a magnetic field of 2 kOe generated by a permanent magnet.

Example 4 (EX-4)

To a 20 dram vial was added 2.0 g of SAP4 and 2 g of the PE-4 polyionic binding solution described above. This was stirred for 16 hours and filtered to remove the excess polyionic binding solution but it was not rinsed. To the collected abrasive grains was added water (2 mL) and 20 mg of PE-2 permalloy flake nanoparticles from plasma torch processing. This was stirred over the weekend (about 64 hours) and the shaped abrasive particles were collected by filtration. This was dried in an oven at 140° C. for 75 minutes. A magnetic response was observed at a magnetic field of 2 kOe generated by a permanent magnet.

Example 5 (EX-5)

To a 20 dram vial was added 2.0 g of SAP4 and 2.0 g of the PE-4 polyionic binding solution described above. This was stirred for 4 hours and filtered to remove the excess polyionic binding solution but it was not rinsed. To the collected abrasive grains was added water (2.0 mL) and 20 mg of permalloy nanopowder SA (iron-nickel alloy, <100 nm by BET, >97%) from Sigma-Aldrich Corporation, Inc. (St. Louis, Mo.). This was stirred overnight (about 16 hours) and the shaped abrasive particles were collected by filtration. This was dried in an oven at 140° C. for 90 minutes and then at 60° C. overnight. A magnetic response was observed via a magnetic field of 2 kOe generated by a permanent magnet. Approximately 150 magnetizable particles were examined under a microscope and 95% were unagglomerated (i.e., single particles) versus agglomerated (i.e., 2 or more particles).

Example 6 (EX-6)

To a 20 dram vial was added 2.0 g of SAP4 and 2.0 g of the PE-4 polyionic binding solution described above. This was stirred for 4 hours and filtered to remove the excess polyionic binding solution but it was not rinsed. To the collected abrasive grains was added water (2.0 mL) and 20 mg of PE-3 permalloy nanopowder (45 nanometer (nm) grain size by XRD (model X'PERT³ PRO MRD XL from PANalytical, Eindhoven, Netherlands)) synthesized via the reduction process given above. This was stirred overnight (about 16 hours) and the shaped abrasive particles were collected by filtration. This was dried in an oven at 140° C. for 90 minutes and then at 60° C. overnight. A magnetic response was observed at a magnetic field of 2 kOe generated by a permanent magnet.

Example 7 (EX-7)

To a 20 dram vial was added 2.0 g of SAP4, 2.0 mL of water, 200 mg of sodium hydroxide, and 0.50 g 2-phosphonobutane-1,2,4-tricarboxylic acid sodium salt (BSG, phosphonate detergent obtained under the trade designation BAYHIBIT S-GRANULATE, from Kurt Obermeier GmbH, Bad Berleburg. Germany). This was stirred magnetically for 5 hours and then filtered to remove the excess sodium hydroxide but it was not rinsed. To the collected abrasive grains was added water (2 mL) and 20 mg of PE-1 V800 nanoparticles from plasma torch processing. This was stirred overnight (about 16 hours) and the shaped abrasive particles were collected by filtration. This was dried in a vacuum oven at 60° C. overnight. A magnetic response was observed at a magnetic field of 2 kOe generated by a permanent magnet.

Example 8 (EX-8)

To a 20 dram vial was added 2.0 g of SAP4, 200 mg of sodium hydroxide, and 2.78 g of glyphosate isopropylamine salt solution (0, obtained under the trade designation ROUNDUP from Monsanto Company, St. Louis, Mo.). This was stirred magnetically for 4 hours and then filtered to remove the excess sodium hydroxide but it was not rinsed. To the collected abrasive grains was added water (2 mL) and 20 mg of PE-1 V800 nanoparticles from plasma torch processing. This was stirred overnight (about 16 h) and the shaped abrasive particles were collected by filtration. This was dried in a vacuum oven at 60° C. overnight. A magnetic response was observed at a magnetic field of 2 kOe generated by a permanent magnet.

Example 9 (EX-9)

To a 20 dram vial was added 2.0 g of SAP3 (shaped abrasive particles with dimensions of 1.4 mm on each side) and 2.0 g of the PE-4 polyionic binding solution described above. This was stirred for 4 hours and filtered to remove the excess polyionic binding solution but it was not rinsed. To the collected abrasive grains was added water (2 mL) and 20 mg of PE-1 V800 nanoparticles from plasma torch processing. This was stirred overnight (about 16 hours) and the shaped abrasive particles were collected by filtration. This was dried in a vacuum oven at 60° C. overnight. A magnetic response is observed at a magnetic field of 2 kOe generated by a permanent magnet.

Control Example 1 (CE-1)

The following was done as a control example (the water glass chemistry binder was eliminated): To a 20 dram vial was added 2.0 g of SAP4, 2.0 mL of water, and 20 mg of PE-1 V800 nanoparticles from plasma torch processing. This was stirred with magnetic stirring for 64 hours and the shaped abrasive particles were collected by filtration. These were dried in an oven at 140° C. for 16 hours and were then analyzed by optical microscopy (Model: VHX-S550E, Keyence Corporation, Osaka, Japan). While the particles appeared to have some metallic coating, they were not very responsive to a magnetic field of 2 kOe generated by a permanent magnet (10% or less of the particles stand vertically).

Control Example 2 (CE-2)

To a 20 dram vial was added 2.0 g of SAP4, 2.0 mL of water, and 200 mg of sodium hydroxide. This was stirred magnetically for 4 hours and then filtered to remove the excess sodium hydroxide but not rinsed. To the collected abrasive grains was added water (2 mL) and 20 mg of PE-1 V800 nanoparticles from plasma torch processing. This was stirred about 16 hours and the shaped abrasive particles were collected by filtration. This was dried in an oven at 140° C. for a few hours and then in the vacuum oven at 60° C. for 16 hours. While the particles appeared to have some metallic coating, they were not very responsive to a magnetic field of 2 kOe generated by a permanent magnet (10% or less of the particles stand vertically).

Example 10 (EX-10)

To 85 g of the PE-5 milling dispersion of P100 in water (~30 wt % magnetite) described above was added 12 g of L25 (aqueous lithium silicate solution obtained under the trade designation LITHISIL 25 LITHIUM SILICATE SOLUTION from PQ Corporation, Valley Forge, Pa.) and 100 mL of water. This was mixed to give a homogenous dispersion. An approximately 2.5 L metal container was charged with 500 g of SAP4. To this was added about 33 g of the above magnetite dispersion such that there was about 1 wt % magnetite added to the shaped abrasive particles with constant stirring. This was stirred until evenly coated. This was then dried about 10 minutes with a heatgun directed into the metal pan. Agglomeration was prevented by the mechanical action of two metal blades spinning in the opposite direction of the large metal pan. A magnetic response is observed at a magnetic field of 2 kOe generated by a permanent magnet.

Example 11 (EX-11)

To 85 g of the PE-5 milling dispersion of P100 in water (~30 wt % magnetite) described above was added 12 g of L25 and 100 mL of water. This was mixed to give a homogenous dispersion. An approximately 2.5 L metal container was charged with 500 g of SAP5 (shaped abrasive particles with dimensions of 0.17 mm on each side). To this was added about 33 g of the above magnetite dispersion such that there was about 1 wt % magnetite added to the shaped abrasive particles with constant stirring. This was stirred until evenly coated. This was then dried about 10 minutes with a heatgun directed into the metal pan. Agglomeration was prevented by the mechanical action of two metal blades spinning in the opposite direction of the large metal pan. A magnetic response is observed at a magnetic field of 2 kOe generated by a permanent magnet.

Example 12 (EX-12)

To 26 g of the PE-5 milling dispersion of P100 in water (~30 wt % magnetite) described above was added 4 g of L25 and 80 mL of water. This was mixed to give a homogenous dispersion. An approximately 2.5 L metal container was charged with 500 g of SAP6 (shaped abrasive particles with dimensions of 0.05 mm on each side). To this was added about 33 g of the above magnetite dispersion such that there was about 1 wt % magnetite added to the shaped abrasive particles with constant stirring. This was stirred until evenly coated. This was then dried about 10 minutes with a heatgun directed into the metal pan. Agglomeration was prevented by the mechanical action of two metal blades spinning in the opposite direction of the large metal pan. A magnetic response is observed at a magnetic field of 2 kOe generated by a permanent magnet.

Example 13 (EX-13)

Approximately 50 g of SAP4 was loaded into a stainless-steel chamber of a fluidized bed dryer (Model 501, Sherwood Scientific, Ltd, Cambridge, UK). The ceramic grain was fluidized in a bed of air at 160-170° C. (set point 200° C.) and 20-40% of fan speed (20% during spraying of the coating and 40% during the drying step). The magnetic particle dispersion was sprayed from the top down onto the fluidized bed using an aerosolized spray nozzle with the PE-6 magnetic ink formulation described above. The spray was in five 1 second bursts until about 10 g of the coating solution was sprayed and the ceramic grain was dried thoroughly after each spraying (about 3 minutes). A magnetic response is observed at a magnetic field of 2 kOe generated by a permanent magnet.

Example 14 (EX-14)

An abrasive article was prepared by coating a YF coated backing (obtained under the trade designation POWER-STRAIT from Milliken & Company, Spartanburg, S.C.) with phenolic resin (obtained as GP 8339 R-23155B from Georgia Pacific Chemicals, Atlanta, Ga.) at a weight of 15 grains per 4 inches×6 inches (10.16 cm×15.24 cm). Once coated, the backing was placed on top of a 4 inches×2 inches×1 inch (10.16 cm×5.085 cm×2.54 cm) N42 Neodymium magnet (Applied Magnets, Plano, Tex.).

A salt shaker-type dispenser was used to uniformly coat 31 grains per 4 inches×6 inches (10.16 cm×15.24 cm) with SAP4 coated with V800 nanoparticles from plasma torch processing (EX-3) onto the resin coated backing. The resin coated backing was then lifted straight upward off the magnet and placed in a solvent rated oven. The sample was kept in the oven for 30 minutes at 200° F. (93° C.). When the sample was viewed with a microscope it was apparent that discreet (unagglomerated) particles oriented such that the major axis of the ceramic particles was orthogonal to the plane of the binder and backing with the points of the truncated triangular pyramids pointing upward relative to the plane of the binder.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making magnetizable abrasive particles, the method comprising steps:
    a) providing ceramic particles, each ceramic particle having a respective outer surface;
    b) coating the outer surfaces of ceramic particles with an aqueous solution comprising a polyionic material thereby forming polyion-coated ceramic particles; and
    c) combining the polyion-coated ceramic particles with magnetic particles while dispersed in an aqueous solution thereby forming magnetic particle-coated ceramic particles;
    d) drying the magnetic particle-coated ceramic particles in the absence of sintering the polyion.

2. The method of claim 1 wherein after drying the magnetic particle-coated ceramic particles have less than 25% agglomerated magnetic particle-coated ceramic particles.

3. The method of claim 1 wherein the magnetic particles have a magnetic saturation of at least 10 emu/gram.

4. Magnetizable abrasive particles prepared according to claim 1.

5. The magnetizable abrasive particles of claim 4, wherein the magnetizable abrasive particles conform to an abrasives industry specified nominal grade.

6. Magnetizable abrasive particles of claim 4, wherein the magnetizable abrasive particles comprise less than 25% of agglomerated magnetic particle-coated ceramic particles.

7. Magnetizable abrasive particles of claim 4, wherein the magnetic particles have a magnetic saturation of at least 10 emu/gram.

8. An abrasive article comprising a plurality of magnetizable abrasive particles according to claim 4 retained in a binder material.

9. An abrasive article comprising the magnetizable abrasive particles according to claim 4 retained in a binder material disposed on a backing.

10. A method of making an abrasive article, the method comprising steps:
    a) applying the magnetizable abrasive particles according to claim 4 to a binder precursor;
    b) applying a magnetic field to orient the magnetizable abrasive particles; and
    c) drying and/or curing the binder precursor sufficient to fix the respective orientations of the magnetizable abrasive particles.

11. Magnetizable abrasive particles comprising ceramic particles having outer surfaces comprising a coating of unsintered polyion and magnetic particles bonded to the polyion.

12. Magnetizable abrasive particles of claim 11, wherein the polyion is selected from silicate, phosphonate, or carboxylate.

13. Magnetizable abrasive particles of claim 11, wherein the metal oxide comprises alumina.

14. Magnetizable abrasive particles of claim 11, wherein the magnetic particles comprise at least one of iron or nickel an alloy of iron, silicon and nickel, or a ferrite.

15. Magnetizable abrasive particles of claim 14 wherein the magnetic particles have a coercivity of less than 500 Oe.

16. Magnetizable abrasive particles of claim 11, wherein the magnetizable abrasive particles comprise less than 25% of agglomerated magnetic particle-coated ceramic particles.

17. Magnetizable abrasive particles of claim 11, wherein the magnetic particles have a magnetic saturation of at least 10 emu/gram.

18. An abrasive article comprising a plurality of magnetizable abrasive particles according to claim 11 retained in a binder material.

19. An abrasive article comprising the magnetizable abrasive particles according to claim 11 retained in a binder material disposed on a backing.

20. A method of making an abrasive article, the method comprising steps:
    a) applying the magnetizable abrasive particles according to claim 11 to a binder precursor;
    b) applying a magnetic field to orient the magnetizable abrasive particles; and
    c) drying and/or curing the binder precursor sufficient to fix the respective orientations of the magnetizable abrasive particles.

* * * * *

UNITED STATES PATENT AND TRADEMARK OFFICE
CERTIFICATE OF CORRECTION

PATENT NO. : 11,597,860 B2
APPLICATION NO. : 16/338756
DATED : March 7, 2023
INVENTOR(S) : Adam D Miller et al.

It is certified that error appears in the above-identified patent and that said Letters Patent is hereby corrected as shown below:

In the Claims

Column 30
Line 34 (approx.), In Claim 14, after "iron or nickel", insert --,--.

Signed and Sealed this
Eighth Day of August, 2023

Katherine Kelly Vidal
*Director of the United States Patent and Trademark Office*